US011615663B1

(12) United States Patent
Chinoy et al.

(10) Patent No.: US 11,615,663 B1
(45) Date of Patent: Mar. 28, 2023

(54) USER AUTHENTICATION SYSTEM

(71) Applicant: AMAZON TECHNOLOGIES, INC., Reno, NV (US)

(72) Inventors: Ammar Chinoy, Seattle, WA (US); Yasser Baseer Asmi, Redmond, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/306,669

(22) Filed: Jun. 17, 2014

(51) Int. Cl.
*G06F 21/31* (2013.01)
*G06F 21/50* (2013.01)
*G07C 9/37* (2020.01)
*H04N 5/232* (2006.01)

(52) U.S. Cl.
CPC ........... *G07C 9/37* (2020.01); *H04N 5/23219* (2013.01)

(58) Field of Classification Search
CPC ................ G07C 9/00158; H04N 5/23219
See application file for complete search history.

(56) References Cited

U.S. PATENT DOCUMENTS

| | | | | |
|---|---|---|---|---|
| 6,256,737 B1 * | 7/2001 | Bianco | ..................... | G07C 9/37 713/186 |
| 6,801,907 B1 * | 10/2004 | Zagami | .................. | G07C 9/253 707/999.009 |
| 7,006,672 B2 * | 2/2006 | Sato | ........................ | G07C 9/38 340/5.2 |
| 7,050,608 B2 * | 5/2006 | Dobashi | ............... | G06K 9/6255 340/5.83 |
| 7,131,136 B2 * | 10/2006 | Monroe | ................. | H04N 7/181 348/E7.086 |
| 7,221,931 B2 * | 5/2007 | Benco | ................. | H04L 63/0861 455/410 |
| 7,225,980 B2 | 6/2007 | Ku et al. | | |

(Continued)

FOREIGN PATENT DOCUMENTS

WO WO-2013013336 A1 * 1/2013 ......... G06F 17/3028

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Philip P. Dang
(74) *Attorney, Agent, or Firm* — Lindauer Law, PLLC

(57) ABSTRACT

Described are systems and techniques configured to authenticate a user upon entry to a facility. Prior to entry, the user may log in to a secure website with valid credentials, whereupon a login image of the user at the time of login is acquired. In one implementation, optically encoded data is generated which includes data representative of the login image, an acquisition timestamp, and an identifier value. At entry of the user to the facility, an entry image of the user's face, an image of the optically encoded data as presented on a display of a computing device in possession of the user, and an entry timestamp are acquired. By determining the timestamp is within a valid range of time and the data representative of the login image corresponds to the entry image, the user is authenticated to the identifier value.

22 Claims, 10 Drawing Sheets

(56) References Cited

U.S. PATENT DOCUMENTS

| | | | | |
|---|---|---|---|---|
| 7,546,947 B1* | 6/2009 | Arias | G06Q 20/20 | 235/383 |
| 7,555,148 B1* | 6/2009 | Steinberg | G06F 16/583 | 340/5.83 |
| 7,634,662 B2* | 12/2009 | Monroe | G08B 13/19671 | 382/117 |
| 7,881,548 B2* | 2/2011 | Ono | G06V 40/168 | 382/254 |
| 7,949,568 B2 | 5/2011 | Fano et al. | | |
| 7,979,716 B2* | 7/2011 | Fiske | G06F 21/34 | 713/184 |
| 8,009,864 B2 | 8/2011 | Linaker et al. | | |
| 8,059,858 B2* | 11/2011 | Brundage | G07F 7/086 | 382/116 |
| 8,189,855 B2 | 5/2012 | Opalach et al. | | |
| 8,292,178 B2* | 10/2012 | Chaves | H05K 1/0269 | 235/494 |
| 8,301,893 B2* | 10/2012 | Brundage | G07F 7/082 | 713/176 |
| 8,385,971 B2* | 2/2013 | Rhoads | G06V 40/172 | 382/312 |
| 8,417,000 B1* | 4/2013 | Mendis | G06V 20/176 | 382/118 |
| 8,570,586 B2* | 10/2013 | Calhoon | G06T 1/0021 | 358/1.18 |
| 8,577,053 B1* | 11/2013 | Simon | H04R 27/00 | 381/98 |
| 8,600,121 B2* | 12/2013 | Gamliel | G06V 40/171 | 382/118 |
| 8,630,924 B2 | 1/2014 | Groenevelt et al. | | |
| 8,688,579 B1* | 4/2014 | Ethington | G06V 30/416 | 705/42 |
| 8,718,373 B2* | 5/2014 | Mendis | H04N 5/23222 | 382/181 |
| 9,139,091 B1* | 9/2015 | Penilla | G06F 21/45 | |
| 9,235,928 B2 | 1/2016 | Medioni et al. | | |
| 9,325,709 B2* | 4/2016 | Beckmann | G06F 16/119 | |
| 9,336,687 B2* | 5/2016 | Exeter | G09B 7/00 | |
| 9,467,515 B1* | 10/2016 | Penilla | B60L 50/64 | |
| 9,760,803 B2* | 9/2017 | Kulick | G06K 9/6267 | |
| 9,971,741 B2* | 5/2018 | Le Chevalier | G06F 16/254 | |
| 10,176,611 B2* | 1/2019 | Felt | H04N 21/47205 | |
| 10,487,651 B2* | 11/2019 | Dursun | E21B 49/08 | |
| 2001/0027475 A1* | 10/2001 | Givol | H04N 21/25883 | 348/E7.071 |
| 2003/0123069 A1* | 7/2003 | Perala | H04N 5/23206 | 348/E5.042 |
| 2004/0003295 A1* | 1/2004 | Elderfield | G07C 9/257 | 713/176 |
| 2004/0068583 A1* | 4/2004 | Monroe | H04L 67/5651 | 709/246 |
| 2004/0111322 A1* | 6/2004 | Arias | G06Q 20/342 | 705/16 |
| 2005/0097019 A1* | 5/2005 | Jacobs | G06Q 40/00 | 705/45 |
| 2006/0206717 A1* | 9/2006 | Holt | G06F 21/36 | 726/16 |
| 2007/0014442 A1* | 1/2007 | Yu | H04N 1/4413 | 340/5.83 |
| 2008/0039121 A1* | 2/2008 | Muller | H04M 7/0036 | 455/456.3 |
| 2008/0046919 A1* | 2/2008 | Carmi | H04N 7/10 | 725/32 |
| 2008/0080748 A1* | 4/2008 | Sukegawa | G06V 40/10 | 382/118 |
| 2008/0126478 A1* | 5/2008 | Ferguson | G16H 30/20 | 715/733 |
| 2009/0080715 A1* | 3/2009 | van Beek | G06V 40/166 | 348/E7.087 |
| 2009/0119013 A1* | 5/2009 | O'Malley | G06Q 20/20 | 701/431 |
| 2009/0153293 A1* | 6/2009 | Chou | G06F 21/32 | 340/5.53 |
| 2009/0187435 A1* | 7/2009 | Carr | G07C 9/20 | 235/382 |
| 2010/0097177 A1* | 4/2010 | Chou | G06V 40/19 | 348/78 |
| 2010/0111377 A1* | 5/2010 | Monroe | G07C 9/38 | 382/118 |
| 2010/0289776 A1* | 11/2010 | Bryborn Krus | G06F 3/03545 | 345/179 |
| 2011/0011936 A1 | 1/2011 | Morandi et al. | | |
| 2011/0091080 A1* | 4/2011 | Gamliel | G06V 40/171 | 382/118 |
| 2011/0313861 A1* | 12/2011 | Lawrence, III | H04L 67/561 | 705/14.66 |
| 2012/0069131 A1* | 3/2012 | Abelow | G06Q 30/0601 | 345/589 |
| 2012/0078751 A1* | 3/2012 | MacPhail | G06Q 20/12 | 705/26.41 |
| 2012/0218301 A1* | 8/2012 | Miller | G06Q 30/02 | 345/633 |
| 2012/0284132 A1 | 11/2012 | Kim et al. | | |
| 2013/0104205 A1* | 4/2013 | Hsi | G06F 21/32 | 726/6 |
| 2013/0125167 A1* | 5/2013 | Sharif-Ahmadi | H04N 21/2343 | 725/37 |
| 2013/0169801 A1* | 7/2013 | Martin | H04N 5/23219 | 348/222.1 |
| 2013/0215116 A1* | 8/2013 | Siddique | G06Q 20/40 | 705/26.7 |
| 2013/0251214 A1* | 9/2013 | Chung | H04N 5/225 | 382/116 |
| 2013/0262333 A1* | 10/2013 | Wicker | G06Q 10/00 | 705/325 |
| 2013/0284806 A1 | 10/2013 | Margalit | | |
| 2014/0123275 A1* | 5/2014 | Azar | G06F 21/36 | 726/19 |
| 2014/0143139 A1* | 5/2014 | Koplovitz | G06Q 20/3255 | 705/39 |
| 2015/0086107 A1 | 3/2015 | Dedeoglu et al. | | |
| 2018/0032997 A1* | 2/2018 | Gordon | G06Q 30/0269 | |

OTHER PUBLICATIONS

Kalnikaite, et al., "How to Nudge In Situ: Designing Lambent Devices to Deliver Information Salience in Supermarkets", ACM, in proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

\* cited by examiner

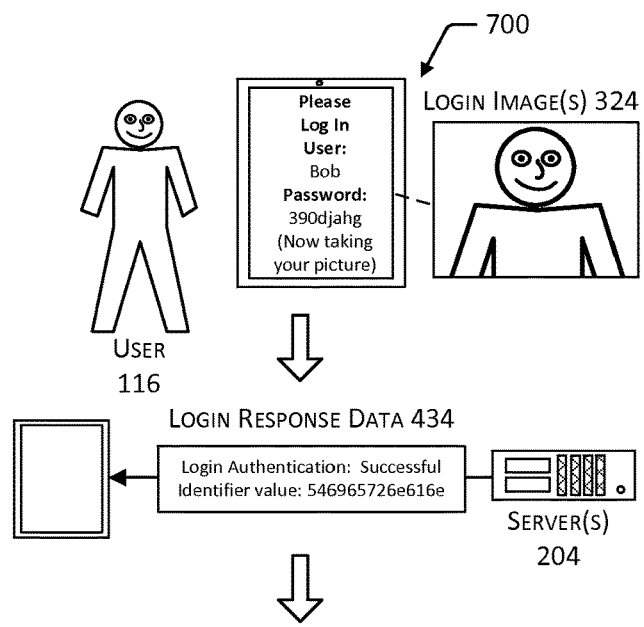

702    USER LOGS IN ON USER DEVICE, AND A PICTURE OF THE USER IS TAKEN WHILE LOGIN CREDENTIALS ARE ENTERED

704    THE LOGIN CREDENTIALS ARE AUTHENTICATED, SUCH AS BY A SERVER

706    OPTICALLY ENCODED DATA (OED) IS GENERATED WHICH ENCODES A LOGIN TIMESTAMP, IDENTIFIER VALUE, AND LOGIN FACIAL CHARACTERISTICS

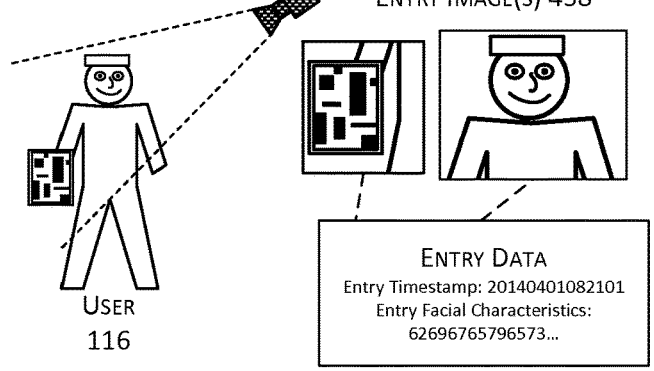

708    AS THE USER ENTERS THE FACILITY, ONE OR MORE ENTRY IMAGES ARE ACQUIRED OF THEIR FACE AND A DISPLAY OF THE USER DEVICE WHICH IS PRESENTING THE OED

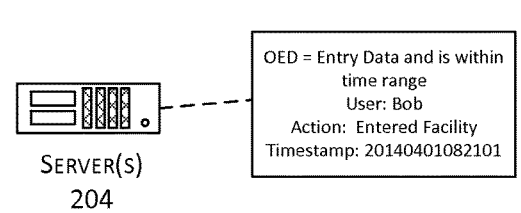

710    DECODE THE OED AND AUTHENTICATE THE USER BASED ON THE TIMESTAMPS AND A COMPARISON OF THE FACIAL CHARACTERISTICS

FIG. 7

USER AUTHENTICATION SYSTEM

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It may be desirable to monitor or control physical access by a user to the facility based on an identity of the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 illustrates an authentication scenario involving the user device and sensors at the facility, according to some implementations.

Figure 1:
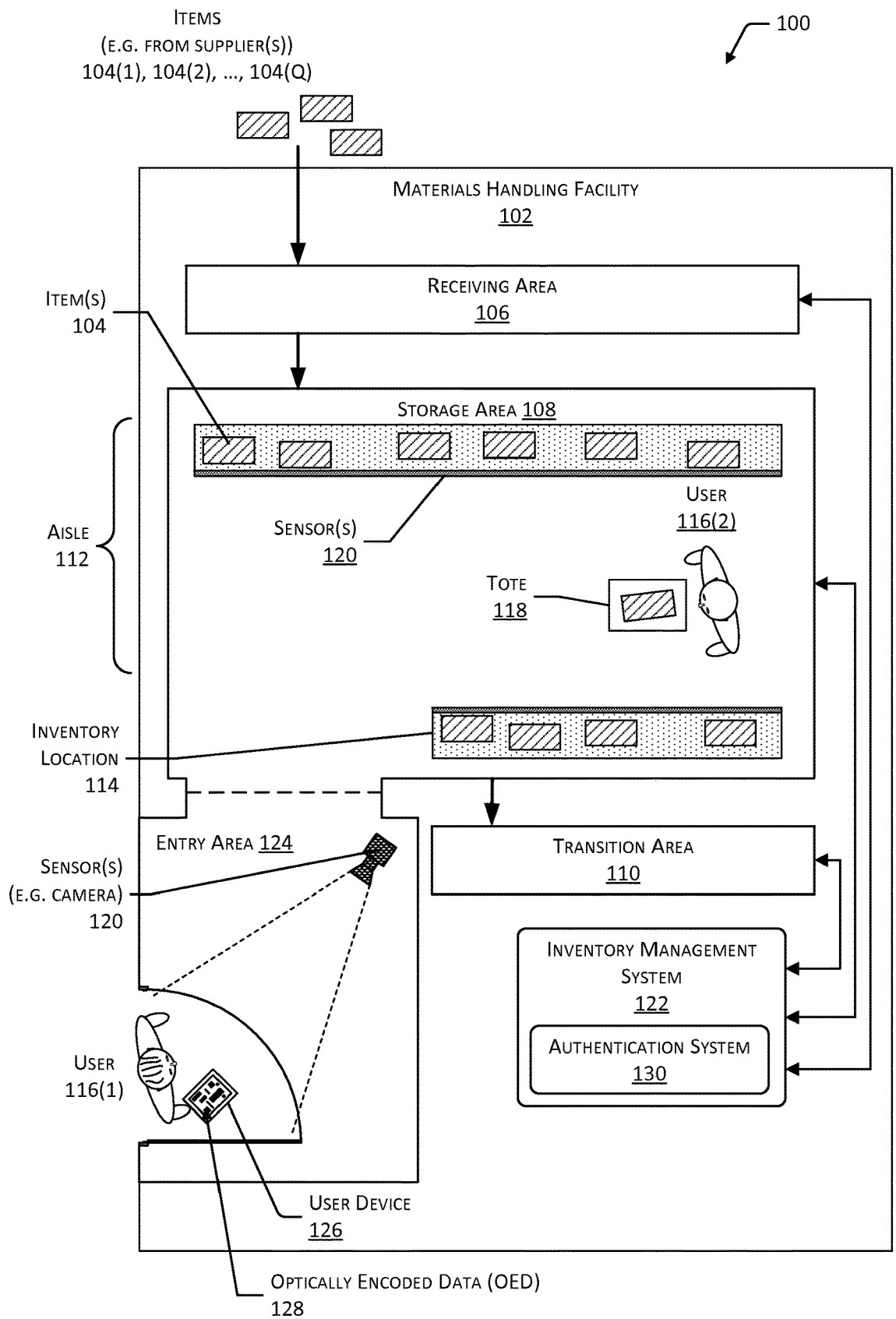
FIG. 1 is a block diagram illustrating a materials handling facility (facility) configured to authenticate a user based on their image and optically encoded data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for authenticating an identity of a user of a materials handling facility (facility). The facility may include, or have access to, an inventory management system. The inventory management system may be configured to maintain information about items within the facility. For example, the inventory management system may maintain information indicative of quantities of items at various inventory locations, movement of items, and so forth.

The inventory management system may generate a user interface which presents information associated with operation of the facility to the user. The user interface may include a single image, or several images or other elements. For example, the user interface may present a list of items to be picked, confirm identification of an item which has been picked, specify location of an item to be picked, and so forth. The user interface may be presented to the user by way of one or more display devices. The user interface as well as information presented thereon may be customized or adjusted based on the identity of the user. For example, a first user may see a first list of items to be picked while a second user sees a second list of items to be picked which is different from the first. Based on the identity of the user, the inventory management system may be configured to present information, accept input, and otherwise interact with the user in a fashion which is customized to that user. In some implementations physical access to the facility or portions thereof may also be restricted based on the identity. For example, the facility may implement restricted access which permits entry only to authorized users for whom identity has been authenticated.

Authentication is used to establish the identity of a user. The identity of the user may uniquely distinguish one user from another. Traditional techniques used to authenticate users upon entry have relied upon operations which may delay entry into the facility. For example, having users swipe a card, manually enter a code, and so forth may delay the flow of users into the facility. Single factor authentication systems, such as those using facial recognition alone may still require the user to pause, and may also be prone to errors. These errors may include incorrectly recognizing one user with an incorrect identity, not recognizing a user which should be, and so forth.

Described in this disclosure are systems and techniques for providing a multifactor authentication which is distributed across several devices, such as a user device and a server which is processing data acquired at an entry area to the facility. The user device may include, but is not limited to smartphones, tablet computers, laptop computers, gaming devices, portable media players, and so forth.

The user device is in the possession of the user. Prior to entering the facility, the user is authenticated using the user device. The authentication process may be performed on the user device, on an external device which the user device is in communication with such as an authentication server, or a combination thereof. For example, the user may use a browser executing on the user device to access a service executing on a server. The website may use authentication which calls for entry of login credentials such as one or more of a username, password, fingerprint, and so forth. Continuing the example, the user may enter these login credentials and be authenticated to the service. The user device is configured to acquire one or more login images of the user contemporaneous with the entry of the login credentials. For example, while the user is typing the username and password or holding a finger to a fingerprint sensor, a front-facing camera of the user device stores an image which includes at least a portion of the user's face. Also stored is a login timestamp indicating a date and time at which the login image was taken.

The login image is processed to determine one or more login facial characteristics. The login image may be processed by the user device, may be sent for processing to an external device such as a server, or a combination thereof. The login facial characteristics comprise data which is indicative of one or more facial features in the login image. The facial features may include facial fiducials or ordinal points. For example, the facial features may include eyes, mouth, lips, nose, chin, ears, facial width, skin texture, three-dimensional shape of the face, presence of eyeglasses, and so forth. The facial fiducials may comprise parts or aspects of the facial features, such as where a cheekbone is under the skin. The login facial characteristics may include data which indicates various ratios of relative sizes and spacing of the facial features. For example, the login facial characteristics may indicate eye color, ratio of interpupillary distance to facial width, and so forth.

Optically encoded data is generated which encodes the login facial characteristics and the login timestamp. The optically encoded data may be generated by the user device, an external device such as a server, or a combination thereof. Other information may also be included in the optically encoded data, such as an identifier value. The identifier value is known to the authentication server. For example, the authentication server may have provided the identifier value in response to receiving valid login credentials. In another example, the user device may send the identifier value to the authentication server. At the authentication server, the identifier value is associated with identity data of a particular user. The identifier value may be dynamically generated, may expire, and so forth. For example, today the identifier value for the identity data for the user may be "12345" while tomorrow the identifier value may be "88831".

The optically encoded data comprises a machine readable image or graphic which may be displayed on a display device, printed by a printer, and so forth. The optically encoded data may be represented as a one-dimensional barcode, two-dimensional (2D) matrix code, and so forth. Data may be encoded by using features having different colors or shades. The colors may include black, white, red, green, blue, cyan, magenta, yellow, and so forth. For example, the colors used by the matrix code may be white and black. In some implementations the features of the optically encoded data may be readable using one or more of visible light, infrared light, or ultraviolet light. The optically encoded data may be represented in a 2D matrix code such as compliant with the MaxiCode, QR Code, and so forth. In some implementations, data may be encrypted prior to optical encoding.

The user device now has stored the optically encoded data and presents the optically encoded data on a display of the user device. For example, the matrix code may be presented on at least a portion of the display device. In some implementations the presentation of the optically encoded data may be responsive to the location of the user device. For example, based on position data from a global positioning system (GPS) receiver, cellular data network, based on detection of Wi-Fi access points, and so forth, the user device may be aware of proximity to the facility.

The user enters the facility at an entry area. For example, the entry area may comprise a foyer, door, and so forth. At entry, one or more entry images are acquired, with associated entry timestamp(s). The entry images may include a portion of the user's face, the display of the user device, and so forth. For example, one camera may be configured to acquire an image of the user's face at entry, while another camera acquires an image of the optically encoded data.

The optically encoded data is detected in the entry image. For example, the registration marks of a barcode may be detected. Once detected, the optically encoded data is decoded to produce the login facial characteristics, login timestamp, and other data which may be included, such as the identifier value. The login timestamp and the entry timestamp are compared to determine if they have occurred within a time range. The time range may be bounded, such as having a start time and an end time. For example, a predetermined period of time may be specified. The time range may be open ended, such as specifying times greater than a first time, less than a second time, and so forth. The times range may be relative to a particular time, such as a particular timestamp. For example, a time range of five hours may be specified, such that the login timestamp and the entry timestamp must occur within five hours for the authentication using these techniques to proceed. The time range may be static or dynamically set. For example, the time range may be dynamically set based on a position of the user at the time of the login timestamp and dependent upon an estimated time of arrival at the facility.

The entry image of the user is processed to determine one or more entry facial characteristics. These entry facial characteristics are compared to the login facial characteristics. The comparison need not involve an exact match. For example, tolerances or variance thresholds may be specified, within which the two sets of characteristics will be deemed to match. When the login facial characteristics and the entry facial characteristics are deemed to match, the user's identity is authenticated. For example, the identifier value encoded in the optically encoded data may be used to retrieve the identity data.

In some implementations an additional confirmation may be performed by comparing the entry facial characteristics with historical facial characteristics which have been previously stored in the identity data. For example, the historical facial characteristics may be based on analysis of an image acquired at a time the user was registered with the authentication system.

By using the techniques and systems described, the user may be quickly and easily authenticated upon entry to the facility without delay. The user may simply walk into the facility while holding their user device so the optically encoded data is visible, and be quickly and easily authenticated.

The techniques and systems described may also be used to improve performance and reduce authentication times by reducing a search space comprising the facial characteristics of registered users. In one implementation the acquisition of login credentials, generation of the optically encoded data, or other operations may be used to provide advance notice that the user may be arriving at the facility. Based on this advance notice, the authentication system may prioritize or cache facial characteristics for the user(s). The cached data may be searched first, reducing the search space and potentially improving the response time and accuracy.

In another implementation, the optically encoded data may omit login facial characteristics, such as in the case of a user device unequipped with a front-facing camera. The optically encoded data may encode the login timestamp, the identifier value, and so forth. The authentication system may use one or more of the login timestamp, the identifier, and so forth to retrieve the historical facial characteristics for the associated user, reducing the search space to a single identity to determine a match between the face of the historical data and the entry image. For example, where the optically encoded data encodes only a login timestamp, the authentication system may retrieve the historical facial characteristics for all users in a geographic area having that login timestamp.

By using these techniques, the user may be authenticated upon entry to the facility without subjecting the user to undue delay. Instead of queuing up to swipe cards, enter codes, sign entry books, and so forth, the users may walk in. Using the authenticated identity, the inventory management system or other elements of the facility may be customized or adjusted to the particular user, or group of users. This may improve the efficiency of the user, the facility, or both.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, a transition area 110, and an entry area 124.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms.

One or more users 116 and totes 118 or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104 and may include, but is not limited to, a basket, a cart, a bag, and so forth. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, image sensors, weight sensors, vibration sensors, radio frequency (RF) receivers, temperature sensors, humidity sensors, and so forth. The sensors 120 may be stationary or mobile, relative to the facility 102. For example, the inventory locations 114 may contain cameras configured to acquire images of pick or placement of items 104 on shelves. In another example, the floor of the facility 102 may include weight sensors configured to determine a weight of the user 116 or other object thereupon.

During operation of the facility 102, the sensors 120 may be configured to provide information suitable for tracking how the items 104 move within the facility 102. For example, a series of images acquired by a camera may indicate removal of an item 104 from a particular inventory location 114 and placement within the tote 118. In another example, images acquired by the camera may be used to determine a relative position of the tote 118 with regard to the user 116. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, the entry area 124, or other areas of the facility 102 may be similarly equipped. Furthermore, the arrangement of the various areas within the facility 102 are depicted functionally rather than schematically. For example, in some implementations multiple different receiving areas 106, storage areas 108, entry areas 124, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The entry area 124 is configured with one or more sensors 120 to acquire sensor data as the user 116 enters the facility 102. For example, the entry area 124 may include a plurality of cameras configured to acquire images of the user 116 and a user device 126. The entry area 124 may be located outside of the walls of the facility 102, within the facility 102, or both. For example, the entry area 124 may include sensors 120 which acquire data as the user 116 approaches a door to the facility 102.

The user device 126 may include, but is not limited to smartphones, tablet computers, laptop computers, gaming devices, portable media players, and so forth. The user device 126 presents optically encoded data (OED) 128 on a display device thereof. In some implementations, the optically encoded data 128 may be provided to another user device 126. For example, the optically encoded data 128 may be sent via an SMS message or email to a smart phone associated with the user 116. In another implementation, instead of or in addition to the user device 126, the user 116 may possess a hardcopy of the optically encoded data 128.

The inventory management system 122 may include, or be in communication with, an authentication system 130. The authentication system 130 is configured to determine an identity of the user 116. The user 116 may use the user device 126 to login to, or otherwise authenticate with respect to, the authentication system 130 or another system which is trusted by the authentication system 130. The user 116 may thus be authenticated by the authentication system 130, or a trusted affiliate, before entering the facility 102. Information indicative of this pre-arrival authentication may be stored in the OED 128.

At the facility 102, the authentication system 130 may further authenticate the person which is present at the entry area 124 as the user 116, by comparing the information acquired by the sensors 120 of the entry area 124 with information stored in the OED 128 carried by that user 116. For example, the authentication system 130 may use login timestamps, login facial characteristics, entry timestamps, entry facial characteristics, and so forth, to authenticate the user 116. Other data acquired from the sensors 120 may also be used, such as radio frequency identification (RFID) tags possessed by the user 116, RF signals from the user device 126, and so forth.

Figure 2:
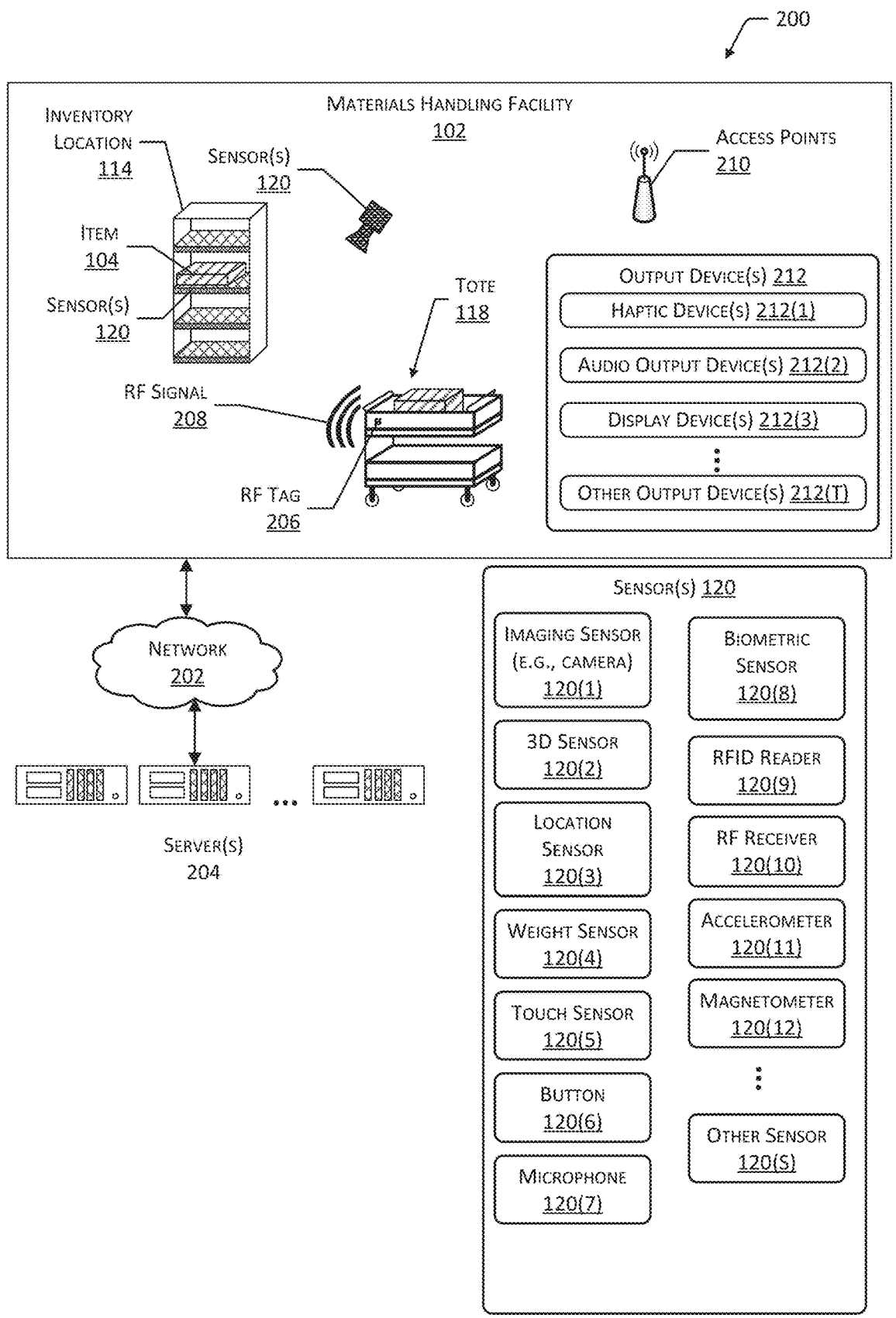
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122, the authentication system 130, and so forth. While the servers 204 are illustrated as being in a location outside of the facility 102, in other implementations at least a portion of the servers 204 may be located at the facility 102. The servers 204 are discussed in more detail below with regard to FIG. 4.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal.

For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal. The optical signal may be emitted using infrared light, visible light, ultraviolet light, or a combination thereof.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth. The tote 118 is configured to carry or otherwise transport one or more items 104. For example, the tote 118 may include a basket, a cart, a bag, and so forth. The tote 118 is discussed in more detail below.

Generally, the inventory management system 122, the authentication system 130, or other systems associated with the facility 102 may include any number and combination of input components, output components, and servers 204.

The one or more sensors 120 may be arranged at one or more locations within or otherwise about the facility 102. For example, the sensors 120 may be mounted on or within a floor, wall, or ceiling, at an inventory location 114, on the tote 118, may be carried or worn by the user 116, mounted outside an entry area 124, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the imaging sensors 120(1) may be used to acquire images of the user 116 and the optically encoded data 128 in the entry area 124. In another example, the inventory management system 122 may identify items 104, users 116, totes 118, and so forth based at least in part on their appearance within the image data. In some implementations the imaging sensors 120(1) may include or be combined with the functions of the three-dimensional sensors 120(2) described next.

One or more three-dimensional (3D) sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, laser scanner, optical time-of-flight cameras, optical interferometry systems, coded aperture cameras, and so forth. For example, a structured light emitter may be configured to provide a structured light pattern at infrared wavelengths which may be detected by the imaging sensor 120(1). In another example the stereo vision system may include two or more cameras configured to generate stereoscopic images. The inventory management system 122 may use the three-dimensional data acquired to identify objects, determine a position of an object, and so forth. For example, the 3D sensors 120(2) may gather 3D data about the user 116 at the entry area 124. The authentication system 130 may use this 3D data to authenticate the user 116.

The location sensor 120(3) may be configured to generate location data. The location data may include geographic location data which is indicative of a latitude and longitude. The location sensor 120(3) may determine a location using an inertial navigation system, dead-reckoning navigation system, cellular network positioning system, known locations of wireless networks, radio navigation, and so forth. For example, the radio navigation systems may use terrestrial or satellite-based transmitters such as a Global Positioning System (GPS) as maintained by the United States of America, GLONASS as maintained by Russia, Galileo as maintained by the European Union, Beidou and COMPASS as maintained by the People's Republic of China, IRNSS as maintained by India, and so forth.

One or more weight sensors 120(4) are configured to measure the weight of a load, such as the item 104, the user 116, the tote 118, and so forth. The weight sensors 120(4) may be configured to measure the weights of the load at one or more of the inventory locations 114, the tote 118, or on the floor of the facility 102. The weight sensors 120(4) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(4) to identify an object, determine a location of an object, maintain shipping records, and so forth.

The sensors 120 may include one or more touch sensors 120(5). The touch sensors 120(5) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 122 may use data from the touch sensors 120(5) to receive information from the user 116. For example, the touch sensor 120(5) may be integrated with a display device to provide a touchscreen with which the user 116 may select from a menu one or more particular items 104 for picking.

One or more buttons 120(6) are configured to accept input from the user 116. The buttons 120(6) may comprise mechanical, capacitive, optical, or other mechanisms. For example, the buttons 120(6) may comprise mechanical switches configured to accept an applied force from a touch of the user 116 to generate an input signal. The inventory management system 122 may use data from the buttons 120(6) to receive information from the user 116.

One or more microphones 120(7) may be configured to acquire information indicative of sound present in the environment. In some implementations arrays of microphones 120(7) may be used. These arrays may implement beam-forming techniques to provide for directionality of gain. The inventory management system 122 may use the one or more microphones 120(7) to acquire information from acoustic tags, accept voice input from the users 116, determine the position of one or more users 116 in the facility 102, determine ambient noise level, and so forth. For example, the inventory management system 122 may be configured to accept speech as input.

The sensors 120 may include one or more biometric sensors 120(8). The biometric sensors 120(8) may be configured to provide information about one or more attributes of the users 116. For example, the biometric sensors 120(8) may include a fingerprint sensor, vascular pattern sensor, palm shape sensor, palm pattern reader, and so forth. Continuing the example, the biometric sensor 120(8) may include a fingerprint sensor which uses pressure, capacitance, heat, electrical resistance, optical interference, and so forth. The fingerprint sensor may generate output indicative of one or more features of a human finger such as patterns, minutia, and so forth. The authentication system 130 may be configured to accept a fingerprint acquired by a fingerprint sensor as part of the login credentials provided by the user device 126.

One more radio frequency identification (RFID) readers 120(9), near field communication (NFC) systems, and so forth may also be provided in the sensors 120. For example the RFID readers 120(9) may be configured to read the RF tags 206. Information acquired by the RFID reader 120(9) may be used by the inventory management system 122 to identify an object associated with the RF tag 206 such as the item 104, the user 116, the tote 118, and so forth.

One or more RF receivers 120(10) may also be provided. In some implementations the RF receivers 120(10) may be part of transceiver assemblies. The RF receivers 120(10) may be configured to acquire RF signals 208 associated with Wi-Fi, Bluetooth, ZigBee, 3G, 4G, LTE, or other wireless data transmission technologies. The RF receivers 120(10) may provide information associated with data transmitted via radio frequencies, signal strength of RF signals 208, and so forth. For example, information from the RF receivers 120(10) may be used by the inventory management system 122 to determine a location of the user device 126.

The sensors 120 may include one or more accelerometers 120(11), which may be worn or carried by the user 116, mounted to the tote 118, and so forth. The accelerometers 120(11) may provide information such as the direction and magnitude of an imposed acceleration. The inventory management system 122 may use this data to determine the movement of the user 116, tote 118, or another object.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) worn by the user 116 may act as a compass and provide information indicative of which way the user 116 is facing.

The sensors 120 may include other sensors 120(S) as well, such as ultrasonic rangefinders, thermometers, barometric sensors, hygrometers, light sensors, and so forth.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the RF tag 206, the user device 126, a communication device of the tote 118, or other devices.

Output devices 212 may also be provided in the facility 102. The output devices 212 are configured to generate signals which may be used to provide information to the user 116. The inventory management system 122 may use the output devices 212 to present a user interface. The user interface may be configured to stimulate one or more senses of the user 116. For example, the user interface may comprise visual, audible, and haptic output.

Haptic output devices 212(1) are configured to provide a signal which results in a tactile sensation of the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetostrictive elements, or electrostatic elements, and so forth. For example, a piezoelectric buzzer or a speaker may be used to provide acoustic output.

The display devices 212(3) may be configured to provide output which may be seen by the user 116, or detected by a light-sensitive detector such as an imaging sensor 120(1) or light sensor. The output may be monochrome or color. The display devices 212(3) may be emissive, reflective, or both. An emissive display device 212(3) is configured to emit light during operation. For example, a light emitting diode (LED) is an emissive visual display device 212(3). In comparison, a reflective display device 212(3) relies on ambient light to present an image. For example, an electrophoretic display is a reflective display device 212(3). Backlights or front lights may be used to illuminate the reflective visual display device 212(3) to provide visibility of the information in conditions where the ambient light levels are low.

The display devices 212(3) may be configured to present images. For example, the display devices 212(3) may comprise a pixel-addressable display. The image may comprise at least a two-dimensional array of pixels, or a vector representation of an at least two-dimensional image.

Other output devices 212(T) may also be present. For example, the other output devices 212(T) may include lights, scent/odor dispensers, document printers, three-dimensional printers or fabrication equipment, and so forth.

Figure 3:
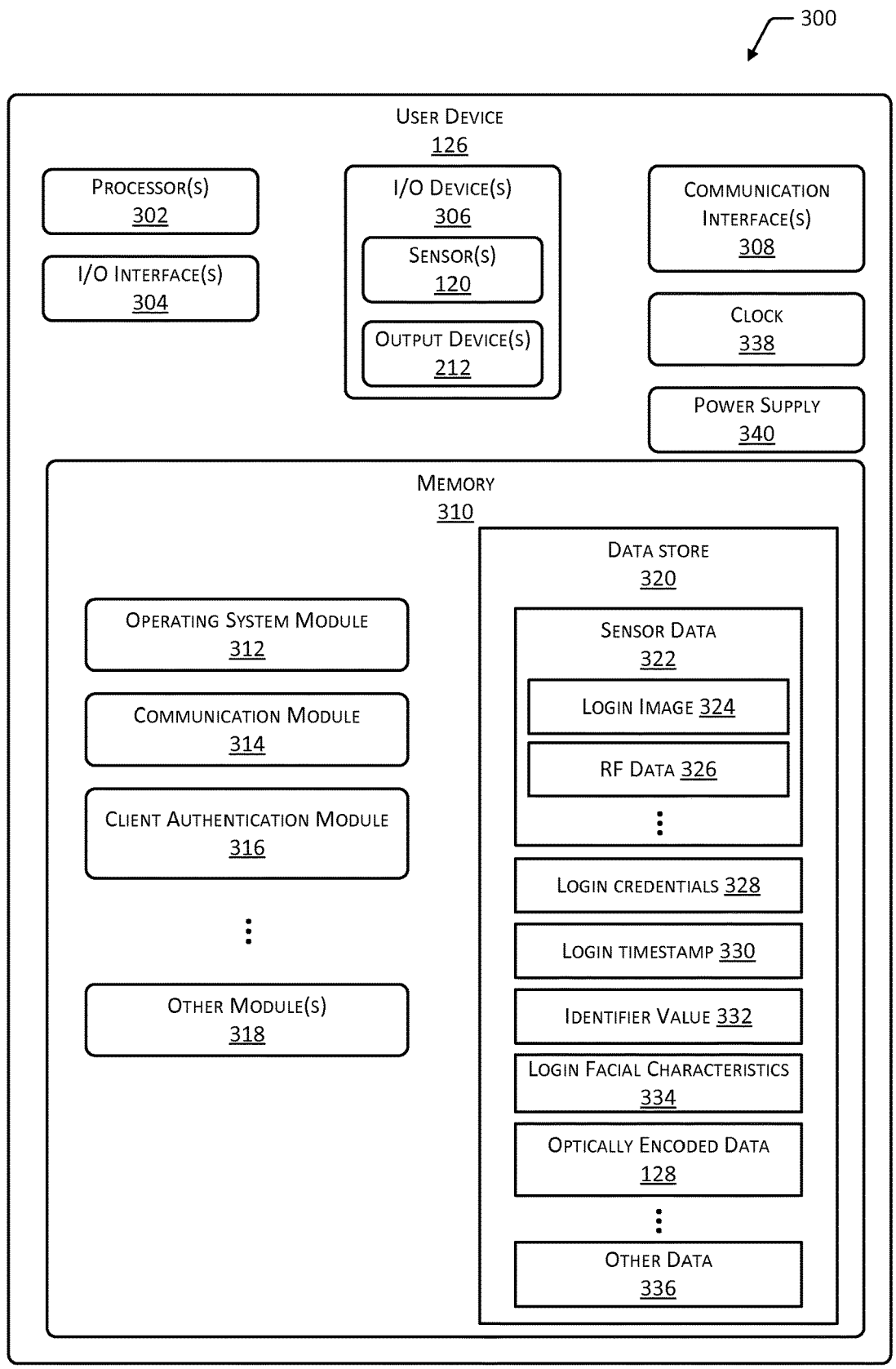
FIG. 3 illustrates a block diagram of a user device configured to participate in authentication of a user of the facility, according to some implementations.

FIG. 3 illustrates a block diagram 300 of the user device 126 configured to support operation of the facility 102, according to some implementations. The user device 126 may be provided by an operator of the facility 102, the user 116, or another party. The user device 126 may include, but is not limited to smartphones, tablet computers, laptop computers, gaming devices, portable media players, and so forth.

The user device 126 may include one or more hardware processors 302 (processors) configured to execute one or more stored instructions. The processors 302 may comprise one or more cores. The user device 126 may include one or more input/output (I/O) interface(s) 304 to allow the processor 302 or other portions of the user device 126 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of an imaging sensor 120(1), touch sensor 120(5), keyboard, other sensors 120, and so forth. The I/O devices 306 may also include output devices 212 such as one or more of a haptic output device 212(1), display device 212(3), audio speakers, and so forth. In some embodiments, the I/O devices 306 may be physically incorporated with the user device 126 or may be externally placed.

The user device 126 may also include one or more communication interfaces 308. The communication interfaces 308 are configured to provide communications between the user device 126 and other devices such as the authentication system 130 or an affiliated system. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The user device 126 may also include one or more busses or other internal communications hardware or software that allow for the transfer of data between the various modules and components of the user device 126.

As shown in FIG. 3, the user device 126 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the user device 126. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows operating system from Microsoft Corporation of Redmond, Wash., the iOS operating system from Apple Corporation, and so forth.

Also stored in the memory 310 may be one or more of the following modules. These modules may be executed as foreground applications, background tasks, daemons, and so forth.

A communication module 314 may be configured to establish communications with the servers 204 or other devices. The communications may be authenticated, encrypted, and so forth.

The memory 310 may include a client authentication module 316. The client authentication module 316 is configured to perform one or more authentication related tasks. In one implementation, the client authentication module 316 may be configured to accept input of login credentials at the user device 126. The login credentials may then be encrypted or otherwise processed and passed along to the server 204 for authentication. The login credentials may include text which is entered by way of a keyboard touchscreen, audio that is received by way of a microphone, data received from a token such as an NFC device, data indicative of the biometric measurement such as a fingerprint, voiceprint, vascular pattern, or iris pattern, and so forth. In some implementations, the client authentication module 316 may authenticate the identity of the user 116 locally without accessing resources on the server 204.

An identifier value may be acquired from the server 204 or generated by the client authentication module 316. The identifier value may comprise, or may be based at least in part upon, one or more of a media access control address of the user device 126, an integrated circuit card identifier (ICCID) of the user device 126, login credentials entered into the user device 126, a hash of identity data associated with a particular user 116, date/time, and so forth. For example, the identifier value generated by the client authentication module 316 may comprise a hash applied to the ICCID and the current date and time. In another example, the identifier value generated by server 204 may comprise a hash based at least in part on user identity data, such as an account identifier. The identifier value may be dynamically generated. In some implementations, the identifier value may have an expiration time after a particular date and time is no longer considered valid.

The client authentication module 316 may be configured to acquire a login image contemporaneously with input of the login credentials. The login image may be acquired at the beginning of entry of the login credentials, during entry, or after entry of the login credentials is complete. For example, the login image may be acquired after the user 116 completes entry of a password, or during a fingerprint scan. In some implementations, a series of images may be acquired. In these implementations, image comparison techniques may be applied to determine if the same person is likely to be depicted throughout a series of images. Should a different person be determined in a series of images, the resulting login image may indicate this discrepancy, which may result in the authentication system 130 denying authentication at the entry area 124. A login timestamp indicating a date and time or other indicia of time at which the login image was taken may also be determined and stored.

The login image may be processed to determine one or more login facial characteristics. The login image may be processed by the user device 126, may be sent for processing to an external device such as the server 204, or a combination thereof. The login facial characteristics comprise data which is indicative of one or more facial features in the login image. The facial features may include facial fiducials or ordinal points. For example, the facial features may include eyes, mouth, lips, nose, chin, ears, facial width, skin texture, three-dimensional shape of the face, presence of eyeglasses, and so forth. The login facial characteristics may include data which indicates various ratios of relative sizes and spacing of the facial features. For example, the login facial characteristics may indicate eye color, ratio of interpupillary distance to facial width, and so forth. In other implementations, other characteristics of the login image may be determined.

The client authentication module 316 may also be configured to generate optically encoded data 128 which includes one or more of the identifier value, the login timestamp, or the login facial characteristics. The optically encoded data 128 comprises a machine readable image or graphic which may be displayed on a display device 212(3), printed by a printer, and so forth. The optically encoded data 128 may be represented as a one-dimensional (1D) barcode, two-dimensional (2D) matrix code, and so forth. Data may be encoded by using features having different colors, shades, widths, and so forth. For example, the optically encoded data 128 may be represented as a 1D barcode such as Code 128, PDF417 stacked linear, and so forth. Continuing the example, the PDF417 may include a plurality of 1D barcodes stacked relative to one another and suitable for reading by a linear scan.

In another example, the optically encoded data 128 may be represented in a 2D matrix code such as MaxiCode, QR Code, and so forth. With a 2D matrix code the data may be encoded by way of placement within a two-dimensional area and color, shade, size, shape, and so forth. Other techniques such as DataGlyphs by the Palo Alto Research Center Inc. may be used to encode data. In some implementations the features of the optically encoded data may be readable using one or more of visible light, infrared light, or ultraviolet light. In some implementations, data may be encrypted prior to optical encoding. For example, a public key infrastructure may be used to encrypt the data prior to optical encoding. In some implementations, the optically encoded data 128 may comprise a plurality of different images or graphics which are presented at different times by the display device 212(3) of the user device 126. For example, the optically encoded data 128 may comprise three different 2-D matrix codes which are presented for 100 milliseconds (ms) each on the display in succession. To aid in capture of the complete sequence, presentation of the sequence may repeat.

The client authentication module 316 is configured to present the optical encoded data 128 on the display device 212(3). In a first implementation, the presentation of the optically encoded data 128 may be manually triggered, such as by the user 116 pressing a button 120(6) of the user device 126. In a second implementation, the presentation of the optically encoded data 128 may be automatic such as at a predetermined date and time.

In a third implementation the presentation may be based at least in part on a location of the user device 126. For example, the user device 126 may include a location sensor 120(3) or an RF receiver 120(10) which may provide information indicating the user device 126 is proximate to the facility 102. Continuing the example, the proximity may be determined based on the geographic coordinates such as latitude and longitude of the user device 126 as determined by the location sensor 120(3) which may then be compared with the geographic coordinates of the facility 102. Alternatively, or in addition to geographic coordinates, the proximity may be determined based on receiving a wireless signal, such as receiving beacon frames transmitted by the access points 210 of the facility 102. Upon determining that the user device 126 is proximate the facility 102, the client authentication module 316 may configure the user device 126 to present the optically encoded data 128 on the display device 212(3).

In some implementations, the client authentication module 316 may be configured to use other output devices 212 coupled to the user device 126 to remind the user 116 to present the display device 212(3) of the user device 126 in the entry area 124. For example, the client authentication module 316 may be configured to provide haptic output using the haptic devices 212(1), audio output using the audio output devices 212(2), or both.

Other modules 318 may also be present in the memory 310. For example, a fingerprint analysis module may be configured to process and encrypt information about the user's 116 fingerprint to use as a login credential.

The memory 310 may also include a data store 320 to store information. The data store 320 may use a flat file, database, linked list, tree, executable code, script, or other data structure to store the information. In some implementations, the data store 320 or a portion of the data store 320 may be distributed across one or more other devices including servers 204, network attached storage devices, and so forth.

The data store 320 may include sensor data 322. The sensor data 322 comprises information acquired from, or based on, the one or more sensors 120 of the user device 126. As described above, the sensors 120 may include an imaging sensor 120(1) which is configured to acquire image data which may be stored in the sensor data 322. The image data may include one or more login images 324, such as acquired by a front facing camera of the user device 126 contemporaneously with the user 116 entering login credentials. The login images 324 may comprise still images or video.

The sensor data 322 may also include a RF data 326. The RF data 326 may include information acquired from RFID or NFC tags in the possession of the user 116. In some implementations the optically encoded data 128 may include data received from an RF tag 206 which is in possession of the user 116 and was read by the RFID reader 120(9) of the user device 126 contemporaneously with the entry of the login credentials. The client authentication module 316 may be configured to encode in the optically encoded data 128 at least a portion of the data received from the RF tag 206, or a hash which is based upon the data received. The authentication system 130 may then use this additional information to authenticate the user 116 at time of entry to the entry area 124 of the facility 102.

The RF data 326 may also include information such as beacon frames or other traffic received by a wireless communication interface 308. For example, the RF data 326 may include a list of access points 210 within range of the communication interface 308. In some implementations, the client authentication module 316 may use the RF data 326 to determine proximity to the facility 102.

The data store 320 may also store the login credentials 328. As described above, the login credentials 328 may include text which is entered by way of a keyboard touchscreen, audio that is received by way of a microphone, data received from a token such as an NFC device, data indicative of the biometric measurement such as a fingerprint, voiceprint, vascular pattern, or iris pattern, and so forth.

The login timestamp 330 indicates a date and time of occurrence of one or more of the login image 324 being acquired, entry of the login credentials 328, and so forth. The login timestamp 330 may be acquired by interrogating a clock on board the user device 126.

The identifier value 332 as described above is known to the server 204 and provides an association between the authentication as performed on the user device 126 responsive to the entry of the login credentials 328 and identity of the user 116. The identifier value 332 may be generated dynamically. For example, the identifier value 332 may be generated using a pseudorandom number generator. In some implementations the identifier value 332 may be configured to expire after a predetermined period of time.

As also described above, the login facial characteristics 334 provide information indicative of the features of the human face present in the login image 324. For example, the login facial characteristics 334 may comprise information indicative of the ratio of eye width to face width of the face depicted in the login image 324. The login facial characteristics 334 may be based at least in part upon, or may incorporate information indicative of, the subject in the login image 324 being acquired from a live subject. This information may be used to distinguish from a login image 324 of a previously acquired still image, for example. In some implementations the login characteristics may include non-facial features, other parts of the user 116, attire or ornaments worn by the user 116, and so forth. The login facial characteristics 334 may be for the user 116(1), or for another user 116(2) which the user 116(1) intends to share credentials with.

The optically encoded data 128 may be stored in the data store 320 as well. The optically encoded data 128 may comprise an image file such as a JPEG, bitmap, PNG, GIF, and so forth. In other implementations, the optically encoded data 128 may be stored in a non-image format which is then rendered to present an image on the display device 212(3).

The data store 320 may store other data 336 as well, such as user preferences, configuration files, permissions associated with user accounts, and so forth. For example, the other data 336 may include user preferences indicating a threshold distance from the facility 102 at which the optically encoded data 128 is presented on the display device 212(3).

The user device 126 may include a clock 338. The clock 338 may be configured to provide date, time, or date and time suitable for use in generating login timestamp 330. In some implementations the clock 338 may be synchronized with an external clock. For example, the clock 338 may be set manually by the user 116 or from input provided by the location sensor 120(3), such as a GPS time signal.

The user device 126 may also include a power supply 340. The power supply 340 is configured to provide electrical power suitable for operating the components in the user device 126.

Figure 4:
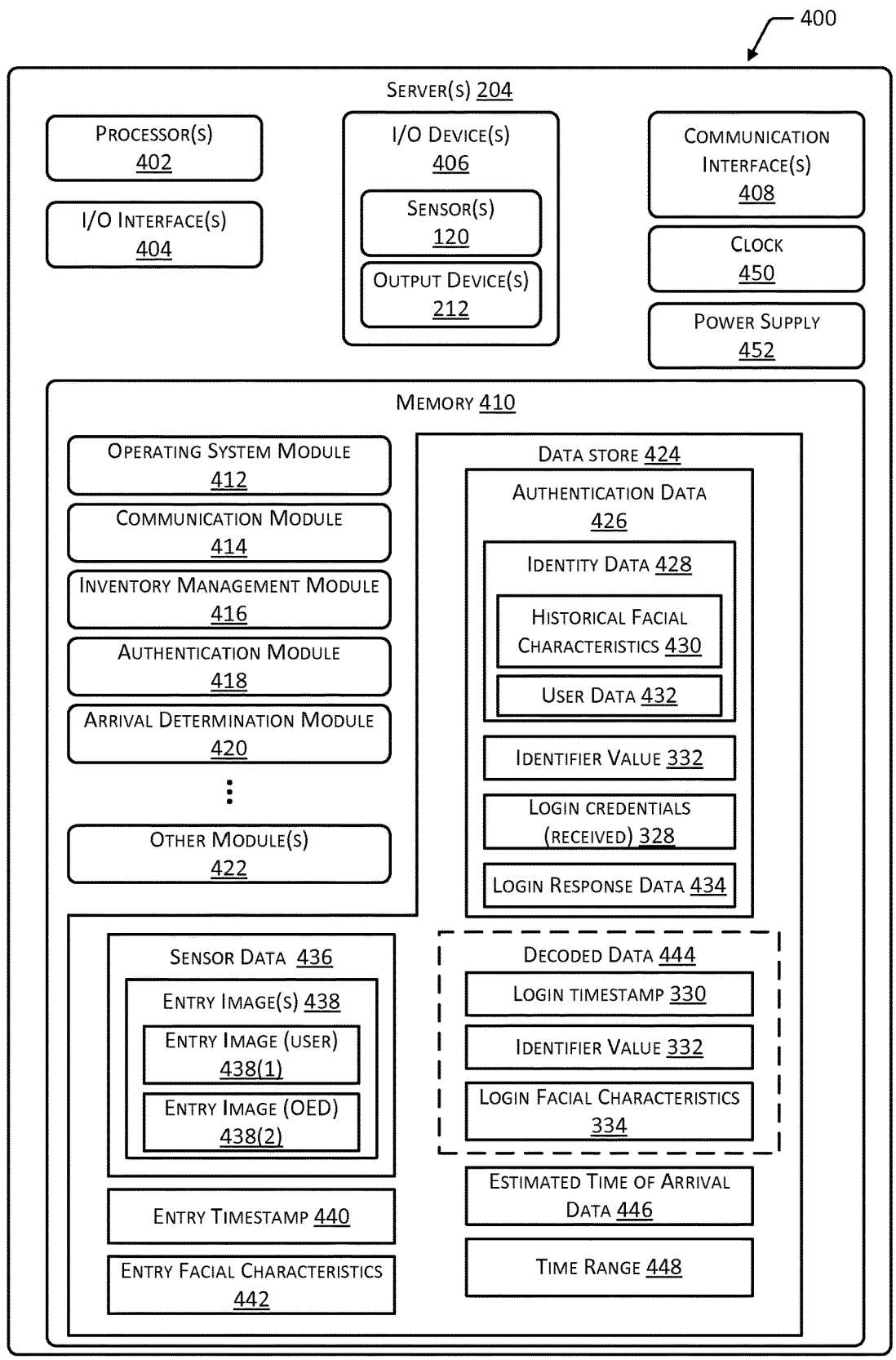
FIG. 4 illustrates a block diagram of a server configured to support operation of the facility, according to some implementations.

FIG. 4 illustrates a block diagram 400 of the server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 402 (processors) configured to execute one or more stored instructions. The processors 402 may comprise one or more cores. The server 204 may include one or more input/output (I/O) interface(s) 404 to allow the processor 402 or other portions of the server 204 to communicate with other devices. The I/O interfaces 404 may comprise I2C, SPI, USB, RS-232, and so forth.

The I/O interface(s) 404 may couple to one or more I/O devices 406. The I/O devices 406 may include one or more of the sensors 120 or other input devices such as a keyboard, mouse, scanner, and so forth. The I/O devices 406 may also include output devices 212 such as one or more of a display, printer, audio speakers, and so forth. In some embodiments, the I/O devices 406 may be physically incorporated with the server 204 or may be externally placed.

The server 204 may also include one or more communication interfaces 408. The communication interfaces 408 are configured to provide communications between the server 204 and other devices, such as the sensors 120, the access points 210, the user devices 126, and so forth. The communication interfaces 408 may include devices configured to couple to PANs, LANs, WANs, and so forth. For example, the communication interfaces 408 may include devices compatible with Ethernet and so forth.

The server 204 may also include one or more busses or other internal communications hardware or software that allow for the transfer of data between the various modules and components of the server 204.

As shown in FIG. 4, the server 204 includes one or more memories 410. The memory 410 comprises one or more CRSM. The memory 410 provides storage of computer-readable instructions, data structures, program modules, and other data for the operation of the server 204. A few example functional modules are shown stored in the memory 410, although the same functionality may alternatively be implemented in hardware, firmware, or as a system on a chip (SOC).

The memory 410 may include at least one operating system (OS) module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, the Windows Server operating system from Microsoft Corporation, and so forth.

Also stored in the memory 410 may be one or more of the following modules. These modules may be executed as foreground applications, background tasks, daemons, and so forth.

A communication module 414 may be configured to establish communications with one or more of the sensors 120, one or more of the user devices 126, other servers 204, or other devices. The communications may be authenticated, encrypted, and so forth.

The memory 410 may store an inventory management module 416. The inventory management module 416 is configured to provide the inventory functions as described herein with regard to the inventory management system 122. For example, the inventory management module 416 may track items 104 between different inventory locations 114, to and from the totes 118, and so forth.

An authentication module 418 is configured to provide the authentication functions as described herein with regard to the authentication system 130. For example, the authentication module 418 may be configured to respond to the login credentials 328 provided by the user device 126 and authenticate the identity of the user 116. This response may include sending login response data to the user device 126. In one implementation, the authentication module 418 may be configured to generate the identifier value 332. In another implementation, the authentication module 418 may receive the identifier value 332 from the user device 126 and associate the identifier value 332 with identity data of a particular user 116.

The authentication module 418 is configured to access image data such as one or more entry images. One or more of the imaging sensors 120(1) acquire the one or more entry images. The entry images include images of the user 116 and the user device 126. An entry timestamp may be associated with one or more of the entry images. The entry timestamp indicates a date and time or other indicia of time at which the entry image was taken.

The authentication module 418 is configured to decode the optically encoded data 128. For example, the decoded data may include one or more of the login timestamp 330, the identifier value 332, the login facial characteristics 334, and so forth.

The authentication module 418 compares the login timestamp 330 and the entry timestamp to determine if they have occurred within a time range of one another. For example, a time range of thirty minutes may be specified, such that the login timestamp and the entry timestamp must occur within thirty minutes of one another for authentication using these techniques to proceed. The time range may be static or dynamically set. In some implementations the period of time may be dynamically set based upon an estimated time of arrival as described below with regard to the arrival determination module 420.

The authentication module 418 may process the entry image(s) of the user 116 to determine one or more entry facial characteristics. Similar to the login facial characteristics described above, the entry facial characteristics provide information indicative of one or more features depicted in the entry image.

The authentication module 418 compares the entry facial characteristics with the login facial characteristics 334 which were decoded from the optically encoded data 128. The comparison may, but need not, require an exact match. For example, tolerances or variance thresholds may be specified, within which the two sets of characteristics will be deemed to match. For example, the login facial characteristics 334 and the entry facial characteristics may be deemed to match when the information about the features is within 3% of one another. When the login facial characteristics 334 and the entry facial characteristics are deemed to match, the user's identity is authenticated. For example, the identifier value 332 encoded in the optically encoded data 128 may be used to retrieve the identity data. In some implementations the comparison may include assessing whether the login image 324, the entry images 438, and so forth are of a living person or an object which is physically present, as compared to an image such as a printed photo or picture shown on a display device.

When the login facial characteristics and the entry facial characteristics are deemed to match, the user's identity may be authenticated. This may include using the identifier value 332 to access identity data associated with the previously authenticated login credentials 328. The authentication at the entry area 124 leverages the previously successful authentication of the user 116 by way of the login credentials 328 entered into the user device 126. The comparison of the face of the user 116 with the information stored in the optically encoded data 128 extends this authentication to the entry area 124.

In some implementations, the authentication module 418 may also compare the entry facial characteristics with historical facial characteristics. The historical facial characteristics may comprise information indicative of the features of the user 116 at a time when the user 116 was registered with the authentication system 130.

The authentication module 418 may send information indicative of the identity data—of the authenticated user 116 to the inventory management module 416. The inventory management module 416 may configure one or more devices within the facility 102 for operation by the authenticated user 116. For example, a particular tote 118 may be configured with user interface preferences specified by the user 116(1) which has been authenticated at the entry area 124. Continuing the example, as the user 116(1) proceeds within the facility 102 and acquires a tote 118 for use, that tote is now customized to their preferences.

In some implementations the authentication module 418 may operate in conjunction with the arrival determination module 420. The arrival determination module 420 is configured to generate an estimated time of arrival (ETA) of the user 116 at the facility 102. The arrival determination module 420 may use information such as that provided by the location sensor 120(3) of the user device 126 to determine a starting point and use a geographic location of the facility 102 as a destination point to determine the ETA. The arrival determination module 420 may utilize map data, traffic information, weather conditions, historical travel time data, and so forth to generate the ETA.

Based on the ETA as generated by the arrival determination module 420, the authentication module 418 may specify a time range within which the user 116 may be expected to arrive at the facility 102. For example, the authentication module 418 may be configured to provide a time range of 30 minutes. This time range specifies a maximum time between which the login timestamp 330 and the entry timestamp may occur and authentication is still permitted. Should the user 116 attempt to enter the facility 102 within that 30 minute period which begins at the login timestamp 330, the authentication process will proceed as described herein. However, beyond that period of time the authentication process may fail, resulting in the user 116 reentering login credentials 328 or otherwise authenticating with the authentication system 130 in another fashion. The authentication module 418 may use the ETA as generated by the arrival determination module 420 to adjust that time range. Continuing the example, the user 116 may authenticate with the authentication system 130 using the user device 126 at 12:00 while away from the facility 102. Given the current location of the user 116, the arrival determination module 420 may calculate an ETA of 12:40. Thus, the user 116 may be expected to arrive at the facility 102 at about 12:40. Based at least in part on the ETA, the time range may be increased or time shifted. Time shifting may comprise setting the 30 minute time range to begin at the ETA, thus the time range would be effective from 12:40 until 13:10. In some implementations, the time shifting may comprise adding the calculated time for the user 116 to arrive at the facility 102 to the login timestamp 330.

Other modules 422 may also be present in the memory 410. For example, an accounting module may be configured to maintain data indicative of entry and exit times for users 116, and so forth.

The memory 410 may also include a data store 424 to store information. The data store 424 may use a flat file, database, linked list, tree, executable code, script, or other data structure to store the information. In some implementations, the data store 424 or a portion of the data store 424 may be distributed across one or more other devices including other servers 204, network attached storage devices, and so forth.

The data store 424 may store authentication data 426. The authentication module 418 may access the authentication data 426 to provide one or more the functions described above. The authentication data 426 may include identity data 428. The identity data 428 may include historical facial characteristics 430, user data 432, or other information. For example, the historical facial characteristics 430 may be based on processing of an image of the user 116 provided at a time of registering the user 116 with the authentication system 130. The user data 432 may comprise information such as account identifier, legal name, home address, payment information, and so forth. In some implementations, the identity data 428 may be described as personally identifiable information.

The authentication data 426 may also include the identifier value 332. The identifier value 332 may be associated with the identity data 428. For example, the identifier value 332 may be used to point to a particular record of identity data 428. The authentication data 426 may also include the login credentials 328 which were received from the user device 126 during the initial authentication of the user 116 before entry to the facility 102. Similarly, the authentication data 426 may also include the login response data 434 which was provided to the user device 126 responsive to the submission of the login credentials 328. For example, the login response data 434 may indicate that the user 116 was able to successfully authenticate with the authentication system 130 using the login credentials 328 which were provided.

The data store 424 may also include sensor data 436. The sensor data 436 comprises information acquired from, or based on, the one or more sensors 120. The sensor data 436 may include one or more entry images 438 acquired by imaging sensors 120(1) of the facility 102. The imaging sensors 120(1) may be configured to acquire images of the face of the user 116 while the user 116 is in the entry area 124. The imaging sensors 120(1) may be configured to acquire images of the display device 212(3) of the user device 126 which is presenting the optically encoded data 128 while the user 116 is holding or otherwise conveying the user device 126 within the entry area 124. Thus, the imaging sensors 120(1) may obtain entry images 438(1) which are of the user 116, entry images 438(2) of the optically encoded data 128, or both.

The sensor data 436 may include RF data acquired by the RFID readers 120(9), RF receivers 120(10), and so forth of the facility 102. As described above, the authentication module 418 may compare this RF data with information acquired at a time of login to further authenticate the user 116. Other sensor data 436 may also be stored in the data store 424.

The data store 424 may also store the entry timestamp 440. The entry timestamp 440 may be associated with one or more of the entry images 438. The entry timestamp 440 indicates a date, time, or other indicia of a time at which the entry image 438 was taken.

The data store 424 may also store the entry facial characteristics 442. Similar to the login facial characteristics 334 described above, the entry facial characteristics 442 provide information indicative of one or more features depicted in the entry image 438. In some implementations other entry characteristics may be used, such as non-facial features, other parts of the user 116, attire or ornaments worn by the user 116, and so forth.

The data store 424 may store decoded data 444. The decoded data 444 comprises the information that has been decoded or otherwise recovered from the optically encoded data 128. For example, the decoded data 444 may include one or more of the login timestamp 330, the identifier value 332, the login facial characteristics 334, and so forth. As described above, the authentication module 418 may use the decoded data 444 in conjunction with the sensor data 436, the entry timestamp 440, and the entry facial characteristics 442 to authenticate the user 116.

The arrival determination module 420 may store ETA data 446 indicative of the estimated time of arrival in the data store 424. Likewise, the authentication module 418 may store the time range 448 information in the data store 424.

Other data may also be stored within the data store 424. For example, the data store 424 may store log information indicative of which users 116 have been authenticated as entering the facility 102 at what times.

The server 204 may include a clock 450. The clock 450 may be configured to provide date, time, or date and time suitable for use in generating the entry timestamp 440. In some implementations, the clock 450 may be synchronized with an external clock. For example, the clock 450 may be set manually or may be set using a protocol such as the network time protocol to retrieve time information via the network 202 from a network time server.

The user device 126 may also include a power supply 452. The power supply 452 is configured to provide electrical power suitable for operating the components in the server 204.

Figure 5:
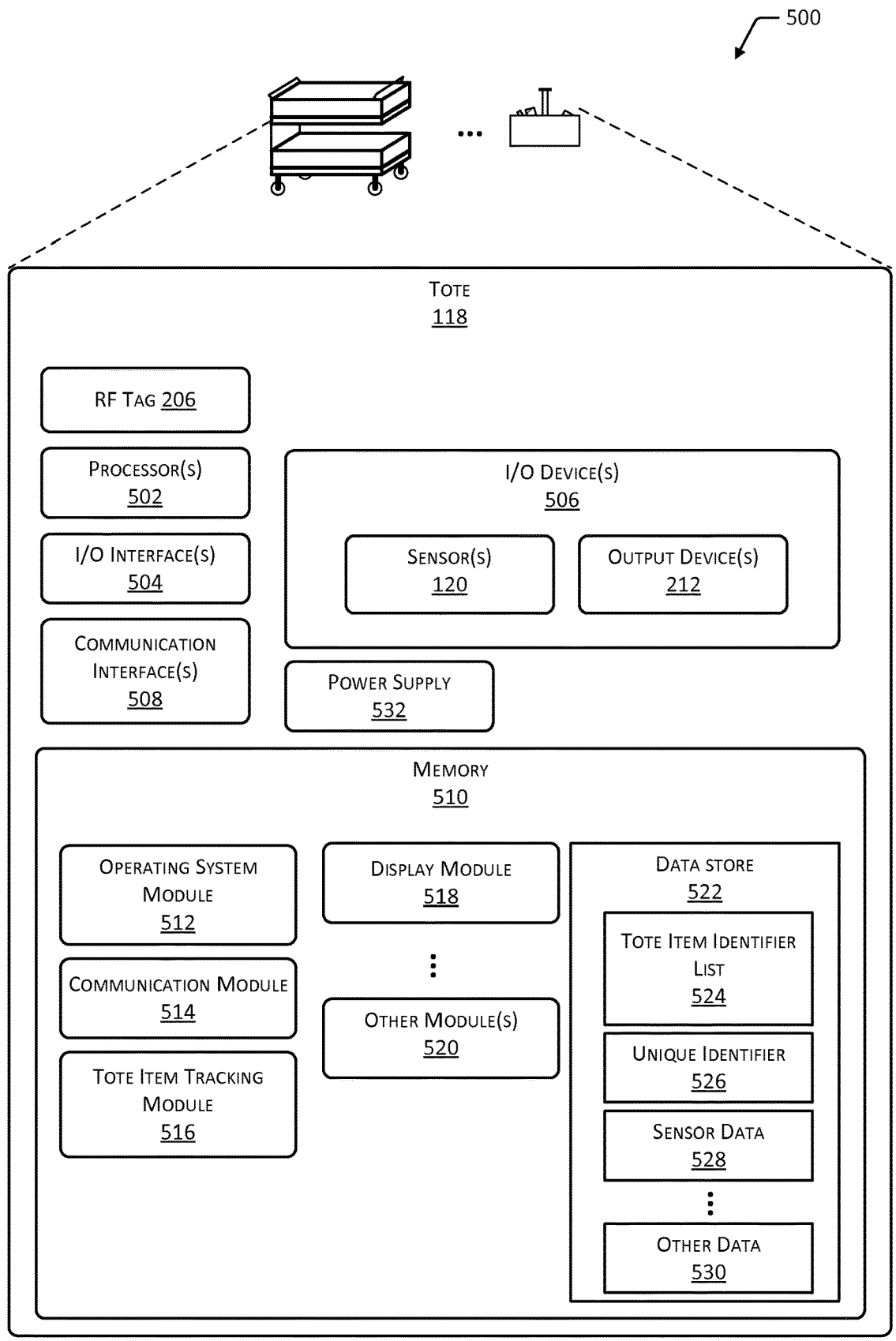
FIG. 5 is a block diagram of one or more components of a tote for use in the facility, according to some implementations.

FIG. 5 illustrates a block diagram 500 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode or optical tag, may be affixed to or printed on a side of the tote 118.

The tote 118 may include one or more hardware processors 502 (processors) configured to execute one or more stored instructions. The processors 502 may comprise one or more cores. The tote 118 may include one or more I/O interface(s) 504 to allow the processor 502 or other portions of the tote 118 to communicate with other devices. The I/O interfaces 504 may include I2C, SPI, USB, RS-232, and so forth.

The I/O interface(s) 504 may couple to one or more I/O devices 506. The I/O devices 506 may include one or more of the input devices such as the sensors 120. As described above, the sensors 120 may include imaging sensors 120(1), location sensors 120(3), weight sensors 120(4), proximity sensors, and so forth. The I/O devices 506 may also include haptic output devices 212(1), audio output devices 212(2), display devices 212(3), and so forth. In some implementations input and output devices 212 may be combined. For example, a touchscreen display may incorporate a touch sensor 120(5) and a display device 212(3). In some embodiments, the I/O devices 506 may be physically incorporated with the tote 118 or may be externally placed.

The tote 118 may also include one or more communication interfaces 508. The communication interfaces 508 are configured to provide communications between the tote 118 and other devices, such as other totes 118, routers, access points 210, the servers 204, and so forth. The communication interfaces 508 may include devices configured to couple to PANs, LANs, WANs, and so forth. For example, the communication interfaces 508 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 5, the tote 118 includes one or more memories 510. The memory 510 comprises one or more CRSM as described above. The memory 510 provides storage of computer readable instructions, data structures, program modules and other data for the operation of the tote 118. A few example functional modules are shown stored in the memory 510, although the same functionality may alternatively be implemented in hardware, firmware, or as a SOC.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 512 may be used, such as the Windows operating system from Microsoft Corporation of Redmond, Wash., the LynxOS from LynxWorks of San Jose, Calif., and so forth.

Also stored in the memory 510 may be one or more of the following modules. These modules may be executed as foreground applications, background tasks, daemons, and so forth.

A communication module 514 may be configured to establish communications with one or more of the sensors 120, the user devices 126, the servers 204, or other devices. The communications may be authenticated, encrypted, and so forth.

The memory 510 may also store a tote item tracking module 516. The tote item tracking module 516 is configured to maintain a list of items 104, which are associated with the tote 118. For example, the tote item tracking module 516 may receive input from a user 116 by way of a touch screen display with which the user 116 may enter information indicative of the item 104 placed in the tote 118. In another example, the tote item tracking module 516 may receive input from the I/O devices 506, such as the weight sensor 120(4) and an RFID or NFC reader 120(9). The tote item tracking module 516 may send the list of items 104 to the inventory management system 122. The tote item tracking module 516 may also be configured to receive information from the inventory management system 122. For example, a list of items 104 to be picked may be presented within a user interface on the display device 212(3) of the tote 118.

The memory 510 may include a display module 518 configured to generate a user interface onboard the tote 118, or receive and present the user interface as provided by one or more of the servers 204 or other devices. In some implementations the information presented on the user interface may be specific to the identity of the authenticated user 116.

Other modules 520 may also be stored in the memory 510. For example, the other modules 520 may include a text to speech module configured to provide audible output of information in the form of human speech.

The memory 510 may also include a data store 522 to store information. The data store 522 may use a flat file, database, linked list, tree, executable code, script, or other data structure to store the information. In some implementations, the data store 522 or a portion of the data store 522 may be distributed across one or more other devices including the servers 204, other totes 118, network attached storage devices and so forth.

The data store 522 may store a tote item identifier list 524. The tote item identifier list 524 may comprise data indicating one or more items 104 associated with the tote 118. For example, the tote item identifier list 524 may indicate the items 104 which are present in the tote 118. The tote item tracking module 516 may generate or otherwise maintain a tote item identifier list 524.

A unique identifier 526 may also be stored in the memory 510. In some implementations, the unique identifier 526 may be stored in rewritable memory, write-once-read-only memory, and so forth. For example, the unique identifier 526 may be burned into a one-time programmable non-volatile memory, such as a programmable read-only memory (PROM). In some implementations, the unique identifier 526 may be part of a communication interface 508. For example, the unique identifier 526 may comprise a media access control address associated with a Bluetooth interface. The unique identifier 526 may be used by the inventory management system 122 to associate the particular tote 118 with a particular user 116 which has been authenticated as described herein.

The data store 522 may also store sensor data 528. The sensor data 528 may be acquired from the sensors 120 onboard the tote 118. Other data 530 may also be stored within the data store 522. For example, tote configuration settings, user interface preferences, and so forth may also be stored.

The tote 118 may also include a power supply 532. The power supply 532 is configured to provide electrical power suitable for operating the components in the tote 118. The power supply 532 may comprise one or more of photovoltaic cells, batteries, wireless power receivers, fuel cells, capacitors, and so forth.

Figure 6:
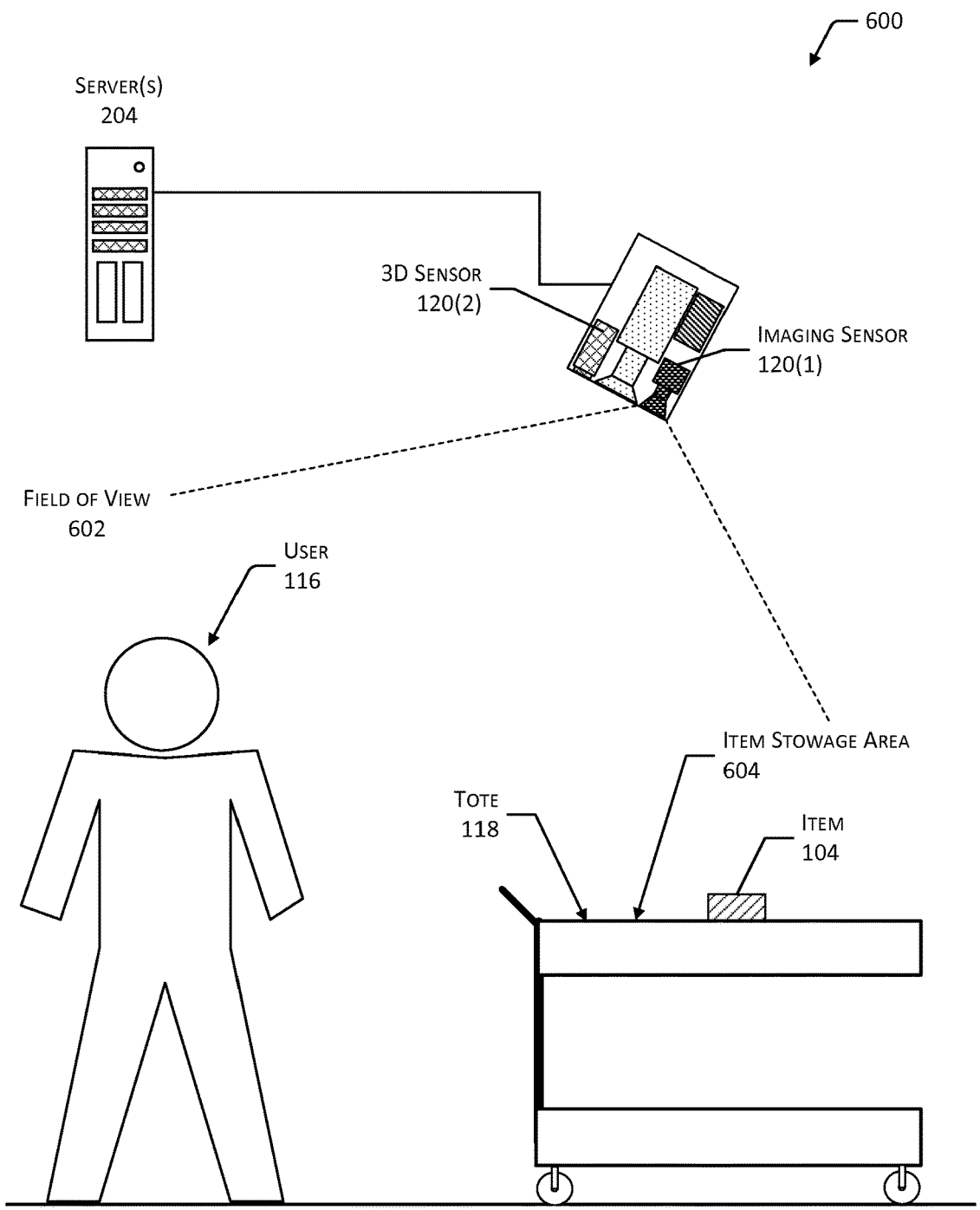
FIG. 6 illustrates a side view of an overhead imaging sensor acquiring an image of the user and the tote.

FIG. 6 illustrates a side view 600 of an overhead imaging sensor 120(1) acquiring an image of the user 116 and the tote 118. In some implementations, the facility 102 may include one or more sensors 120 which are configured to acquire an image from an overhead vantage point such as one or more of the imaging sensors 120(1) or the 3D sensors 120(2). In this illustration, one of the sensors 120 comprises an imaging sensor 120(1) which is configured to generate image data, such as the entry images 438. The sensors 120 have a field of view 602. The field of view 602 depicted here may be configured to acquire images of the faces of users 116, images of the user device 126, and so forth within the entry area 124. As depicted here, the tote 118 includes one or more item stowage areas 604 within which one or more of the items 104 may be placed or contained. The item stowage areas 604 may include baskets, tubs, compartments, bags, platforms, and so forth.

FIG. 7 illustrates an authentication scenario 700 involving the user device 126 and sensors 120 at the facility 102, according to some implementations. This scenario may be implemented using the inventory management system 122, the authentication system 130, or a combination thereof.

At 702 the user 116 uses the user device 126 to login in to the authentication system 130, or an affiliated system. For example, the user 116 may enter a username and password, fingerprint, or other login credentials 328. Contemporaneously with the entry of the login credentials 328, an imaging sensor 120(1) such as a front facing camera acquires one or more login images 324. One or more login timestamps 330 may be generated which are indicative of a time indicia of when the login images 324 are acquired.

At 704 the login credentials 328 are authenticated, such as by the authentication module 418 executing on the server 204. For example, the authentication may include comparing the login credentials 328 as received with previously stored authentication data 426. In some implementations, the authentication module 418 may generate the identifier value 332. The identifier value 332 may be provided to the user device 126. For example, the login response data 434 may include an indication of successful authentication as well as the identifier value 332.

In some implementations, receipt of the login credentials 328 by the authentication system 130 may result in placing the identity data 428 for the authenticated user 116 in a cache used to authenticate entry into the facility 102. As a result, the search space of facial characteristics may be reduced from all possible users 116 which have been registered with the authentication system 130 down to the users 116 which may enter the facility 102. The search space may be further reduced by using the ETA data 446. For example, the contents of the cache may change as time progresses to reflect the different estimated times of arrival of the users 116.

At 706, optically encoded data 128 is generated which encodes information including one or more of the login timestamp 330, the identifier value 332, the login facial characteristics 334, a device identifier indicative of the user device 126, geographic location of the user device 126, or other information. For example, as illustrated here the optically encoded data 128 includes the login timestamp 330, the identifier value 332, and the login facial characteristics 334. The optically encoded data 128 may be generated on the user device 126, the server 204, or a combination thereof.

In some implementations, the user device 126 may not have an imaging sensor 120(1) able to acquire the login image 324. For example, the user device 126 may comprise a tablet which does not have a built-in front facing camera. In this implementation, the optically encoded data 128 may encode information indicating that the particular user device 126 lacks the front facing camera. The authentication system 130 may compare this information with data previously acquired to determine whether a particular user device 126 actually lacks the front facing camera. Should a discrepancy be noted, the authentication described herein may be disallowed. Similarly, should the optically encoded data 128 encode the login facial characteristics 334 from a particular user device 126 which has no imaging sensors 120(1), the authentication described herein may be disallowed.

In some implementations instead of, or in addition to, the optically encoded data 128, information such as the login timestamp 330, the identifier value 332, and the login facial characteristics 334 may be encoded as information which is transmitted by way of a radio frequency signal, acoustic signal, and so forth. For example, an RFID tag or NFC tag of the user device 126 may be configured to transmit the information and may be read by an RFID reader 120(9) or NFC reader at the entry area 124. In another example, an acoustic signal may be generated by audio output device(s) 212(2) of the user device 126 which is then detected by a microphone 120(7) in the entry area 124. Continuing this example, the acoustic signal may be embedded within other acoustic output, such as within music which is being presented.

At 708, as the user 116 enters the facility 102, one or more entry images 438 are acquired. These entry images 438 may include the face of the user 116, the display device 212(3) of the user device 126, or both. For example, the user 116 may enter the entry area 124 holding the user device 126 such that the display device 212(3) is visible to the imaging sensor 120(1) of the entry area 124. As described above, entry timestamps 440 associated with the entry images 438 may be generated. Also, entry facial characteristics 442 or other characteristics of the entry image 438 may be generated.

As described above, in some implementations an additional comparison with historical facial characteristics 430 may be performed. For example, the identifier value 332 as encoded within the optically encoded data 128 may be used to retrieve particular historical facial characteristics 430. The comparison between the entry facial characteristics 442 and historical facial characteristics 430 may then be performed and used to authenticate the user 116. By using the identifier value 332, the search and comparison space is reduced from potentially the entire set of all users 116 which are registered with the authentication system 130 down to a single user 116. In further implementations, the comparison between historical facial characteristics 430 and the entry facial characteristics 442 may use comparison techniques which are more computationally intense, or otherwise configured to provide more accurate results. Use of these techniques may be infeasible on searching a larger search space due to increased processing requirements and time to process.

At 710, the optically encoded data 128 is decoded to produce decoded data 444. For example, the decoded data 444 may include the login timestamp 330, the identifier value 332, and the login facial characteristics 334. Based on the login timestamp 330 and the entry timestamp 440 being within a time range 448 of one another, the login facial characteristics 334 may be compared with the entry facial characteristics 442. Upon determining the comparison is within a threshold tolerance level or range, the user 116 is authenticated. Using the identifier value 332, the particular identity data 428 associated with that user 116 may be retrieved. Once the user 116 has been authenticated, other functions may be provided by the inventory management system 122. For example, operation of the facility 102 may be customized to the authenticated user 116.

Illustrative Processes

Figure 8:
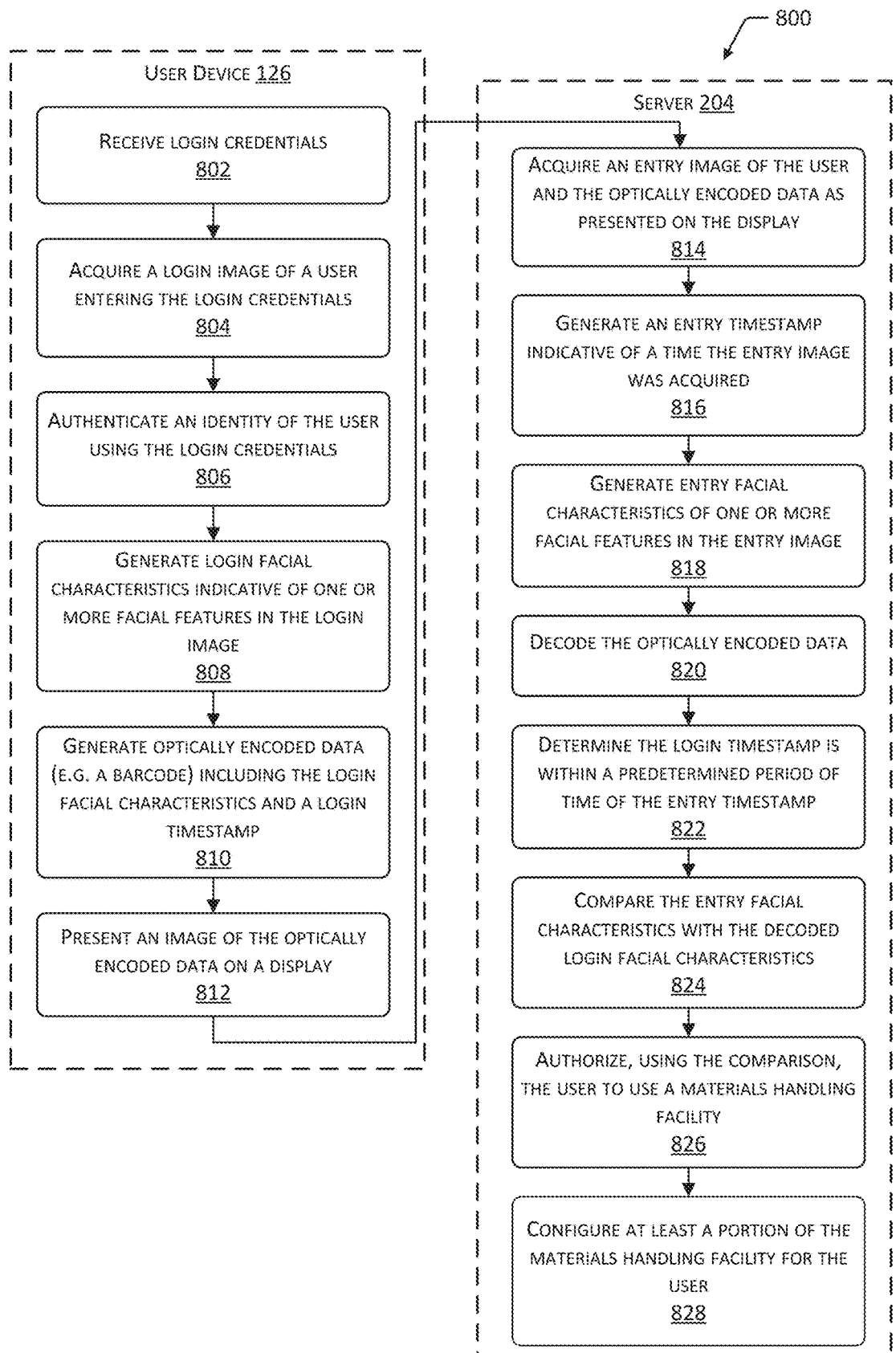
FIG. 8 depicts a flow diagram of a process for authenticating a user at the facility using facial characteristics, according to some implementations.

FIG. 8 depicts a flow diagram 800 of a process for authenticating a user 116 at the facility 102 using facial characteristics, according to some implementations. The process may be performed at least in part by one or more of the client authentication module 316, the inventory management module 416, the authentication module 418, the arrival determination module 420, or another module. Blocks 802 through 812 may be performed by the user device 126, while blocks 814 through 828 may be performed by the server 204.

Block 802 receives login credentials 328. For example, the user 116 may enter a username and password by using a touch sensor 120(5) on a touchscreen. In another example, the user 116 may enter a fingerprint using a fingerprint sensor or other biometric sensor 120(8).

Block 804 acquires a login image 324 of the user 116 with an imaging sensor 120(1). The login image 324 may be acquired contemporaneously with entry of the login credentials 328 by the user 116. Continuing the example, a front facing camera of the user device 126 may acquire the login image 324 while the user 116 is entering a password or scanning a finger.

Block 806 authenticates an identity of the user 116. In one implementation, the login credentials 328 may be authenticated on the user device 126. In another implementation the login credentials 328 or data indicative thereof such as a hash, may be sent to the server 204 which may then authenticate the identity of the user 116. For example, an authentication request based at least in part on the login credentials 328, such as the hash, may be sent to the server 204. The server 204 may respond, providing data indicating the login credentials 328 are acceptable or valid, and indicating the identity of the user 116 is authenticated.

As described above, in some implementations the user device 126 may generate the identifier value 332. The user device 126 may send the identifier value 332 to the authentication system 130. The authentication module 418 may associate the identifier value 332 (which may be received with the login credentials 328) with the identity data 428 of the authenticated user 116.

As also described above, in other implementations the authentication system 130 may generate the identifier value 332. The identifier value 332 may be returned to the user device 126, such as within the login response data 434.

Block 808 generates login facial characteristics 334 indicative of one or more facial features in the login image 324. The facial characteristics comprise data which is indicative of one or more facial features in an image. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations the facial characteristics may include facial metrics. The facial metrics indicate various ratios of relative sizes and spacing of the facial features. For example, the login facial characteristics 334 may indicate eye color, ratio of interpupillary distance to facial width, ratio of eye width to nose width, and so forth. In some implementations the facial characteristics may comprise a set of eigenvectors by using principal component analysis (PCA) on a set of images. These eigenvectors as descriptive of a human face may be known as "eigenfaces" or "eigenimages". In one implementation the image processing described in this disclosure may be performed at least in part using one or more tools available in the OpenCV library as developed by Intel Corporation of Santa Clara, Calif., Willow Garage of Menlo Park, Calif., and Itseez of Nizhny Novgorod, Russia, with information available at www.opencv.org.

Block 810 generates optically encoded data 128. As described above, the optically encoded data 128 comprises an image or data which is configured to generate an image for presentation. The image graphically encodes data using features having different colors or shades. These features may be readable using one or more of visible light, infrared light, or ultraviolet light. The optically encoded data 128 may comprise a one-dimensional barcode, two-dimensional matrix code, and so forth. The optically encoded data 128 may comprise a single image, or a plurality of images which may be presented simultaneously or sequentially on the display device 212(3). In some implementations, the optically encoded data 128 may use steganographic techniques to encode information within another image. The data encoded by the optically encoded data 128 may include one or more of the login timestamp 330 which is indicative of a time the login image 324 was acquired, the identifier value 332, the login facial characteristics 334, information indicative of one or more features or identifiers associated with the user device 126, or other information.

Block 812 presents the image of the optically encoded data 128 on the display device 212(3). As described above, the presentation may include display of a single image, or a plurality of images simultaneously or in sequence. For example, simultaneous presentation may involve presenting three different images of three different two-dimensional matrix codes, wherein each matrix code stores a different piece of the data. Continuing the example, one of the images may encode the login timestamp 330 while another may encode the login facial characteristics 334. As described above, in some implementations the client authentication module 316 may be configured to present the optically encoded data 128 based at least in part on proximity to the entry area 124.

Block 814 acquires an entry image 438 of the user 116 and the optically encoded data 128 as presented on the display device 212(3) of the user device 126. For example, a plurality of the imaging sensors 120(1) may be configured with fields of view 602 such that images of a face of the user 116, the user device 126, and so forth are obtained as the user 116 moves into, through, or out of the entry area 124.

Block 816 determines an entry timestamp 440 indicative of a time the entry image 438 was acquired. For example, a time value may be read from the clock 450.

Block 818 generates entry facial characteristics 442 indicative of one or more facial features in the entry image 438 of the user 116. Generation of the entry facial characteristics 442 may be similar to or the same as those described above with regard to the generation of the login facial characteristics 334.

Block 820 decodes the optically encoded data 128. For example, the authentication module 418 may generate decoded data 444 from the optically encoded data 128.

Block 822 determines the login timestamp 330 is within the time range 448 of the entry timestamp 440. As described above, the time range 448 specifies a predetermined period of time within which the login timestamp 330 and the entry timestamp 440 may occur for the authentication described herein to be used. Should the entry timestamp 440 be outside of the time range 448, the authentication module 418 may use one or more other authentication techniques to authenticate the user 116 upon entry to the facility 102. For example, the other authentication techniques may include reentering the login credentials 328 at a kiosk, terminal, or other input device in the entry area 124.

Block 824 compares the entry facial characteristics 442 with the decoded login facial characteristics 334 to determine the user 116 depicted in the login image 324 and the entry image 438 is the same, or likely to be the same. The entry facial characteristics 442 and the login facial characteristics 334 may be deemed as comparable or matching when within a tolerance or variance thresholds of one another. For example, the tolerance may specify that the facial characteristics must be within 3% of one another to be deemed a match. In some implementations, the tolerances may be associated with particular groups of users 116, or individual users 116. For example, users 116 with facial hair such as mustaches or beards may be allowed a greater tolerance level compared to those who are clean-shaven.

In one implementation an additional comparison with the historical facial characteristics 430 may be performed. For example, the authentication module 418 may retrieve the historical facial characteristics 430 which are associated with the identifier value 332 or the login credentials 328 which have been received. The entry facial characteristics 442 may then be compared with the historical facial characteristics 430 to determine that the user 116 depicted in the entry image 438 is the same as that associated with the historical facial characteristics 430.

Block 826 authorizes the user 116 for an action, such as entry into the facility 102. The authorization may be based at least in part on authentication of the identity of the user 116 using the results of the comparison. For example, when the comparison indicates a match within a threshold tolerance, the identity data 428 for the particular user 116 associated with the identifier value 332 may be retrieved and assigned to the user 116 which is at the entry area 124. In some implementations, the authentication of the user 116 associated with the identifier value 332 may be based at least in part on the comparison between historical facial characteristics 430 and the entry facial characteristics 442. This may be used to provide an additional level of authentication and assurance as to the identity of the user 116. By accessing the particular historical facial characteristics 430 which are associated with the identifier value 332, the amount of data retrieved for comparison is reduced, as compared to retrieving the entry facial characteristics 442 of all or a large section of possible registered users 116. Additionally, use of the identifier value 332 reduces a set of facial characteristics for comparison, further reducing processing requirements to complete this additional comparison. Furthermore, use of the identifier value 332 may permit the comparison of the entry facial characteristics 442 with the historical facial characteristics 430 of the registered user 116 to use more comprehensive or special comparative techniques to improve accuracy.

Block 828 configures at least a portion of the facility 102 for use by the user 116. For example, responsive to the identity data 428 of the user 116 the inventory management module 416 may set the user interface on a tote 118 (which is assigned for use by the user 116) to previously defined user preferences. In another implementation, responsive to the identity data 428, the inventory management module 416 may allow or disallow access to different areas of the facility 102.

Figure 9:
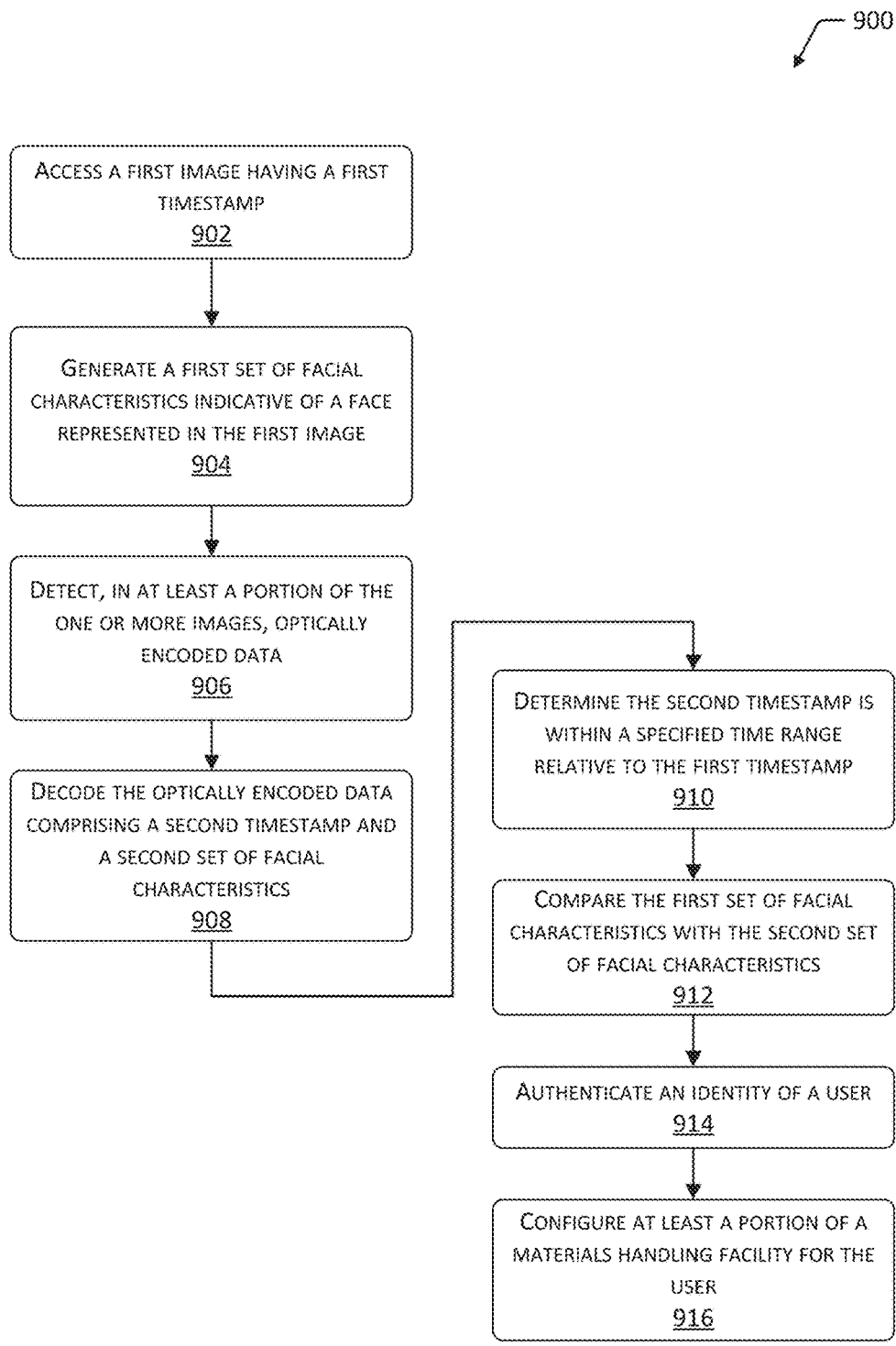
FIG. 9 depicts a flow diagram of another process for authenticating a user at the facility using facial characteristics, according to some implementations.

FIG. 9 depicts a flow diagram 900 of another process for authenticating a user 116 at the facility 102 using facial characteristics, according to some implementations. The process 900 may be performed at least in part by one or more of the inventory management module 416, the authentication module 418, the arrival determination module 420, or another module. In one implementation, blocks 902 through 916 may be performed by the authentication system 130.

Block 902 accesses a first image (or a first set of images) having a first timestamp. For example, the authentication module 418 may access the entry images 438 and their corresponding entry timestamps 440. In some implementations entry of the user 116 to the facility 102 may be determined. Responsive to this determination, the first image may be acquired. For example, a proximity sensor may detect presence of the user 116 in the entry area 124 which in turn triggers storage of entry images 438 acquired by the imaging sensors 120(1).

Block 904 generates a first set of characteristics of the first image (or the first set of images). For example, this may include generating the entry facial characteristics 442 which are indicative of a face represented in the one or more entry images 438.

Block 906 detects, in the image (or at least a portion of the first set of images), optically encoded data 128 presented by a display device 212(3) of a user device 126. For example, the entry images 438 may be processed to look for one or more markers or indicia of a two-dimensional matrix code. In other implementations, the optically encoded data 128 may be printed out, such as on a piece of paper, printed on a badge, printed on an article of clothing, and so forth.

Block 908 decodes the optically encoded data 128 to produce decoded data 444. The optically encoded data 128 may be expressed as a single graphic, plurality of different graphics presented simultaneously, or a plurality of different graphics presented at different times by the display device 212(3) of the user device 126.

In some implementations where the optically encoded data 128 includes encrypted information, the optically encoded data 128 may be decoded to produce encrypted data, and the encrypted data may then be decrypted. The (decrypted and) decoded data 444 may include one or more of a second timestamp; an identifier value 332; or a second set of characteristics. For example, the second timestamp may comprise the login timestamp 330, while a second set of characteristics may comprise the login facial characteristics 334 as acquired from a second image such as the login image 324.

The authentication system 130 may be configured to associate, based on satisfactory login credentials 328, the identifier value 332 with the identity data 428 indicative of particular user 116. The identifier value 332 may be based at least in part on one or more of: a media access control address of the user device 126, an integrated circuit card identifier (ICCID) of the user device 126, the login credentials 328 entered into the user device 126, a hash of at least a portion of the identity data 428, or other information. For example, in the implementations where the authentication system 130 generates the identifier value 332, user data 432 such as a user account identifier may be hashed and used as the identifier value 332.

Block 910 determines the second timestamp is within a specified time range relative to the first timestamp. For example, the login timestamp 330 and the entry timestamp 440 may be within the time range 448.

In some implementations, the time range 448 may vary according to a particular user 116. For example, one user 116(1) may prefer a time range 448(1) of five hours, while another user 116(2) may prefer a shorter time range 448(2) of 30 minutes. In another example, such as described above, the time range 448 for a particular user 116 may be modified based on the ETA data 446 as generated by the arrival determination module 420. In these implementations, another block may be configured to access the stored time range 448 which is associated with the identifier value 332 and modify the time range 448 to account for the ETA data 446.

Block 912 compares the first set of characteristics with the second set of characteristics. For example, the entry facial characteristics 442 may be compared to the login facial characteristics 334, as described above.

In one implementation an additional comparison with the historical facial characteristics 430 may be performed. For example, the authentication module 418 may retrieve the historical facial characteristics 430 which are associated with the identifier value 332 or the login credentials 328 which have been received. The entry facial characteristics 442 may then be compared with the historical facial characteristics 430 to determine that the user 116 depicted in the entry image 438 is the same as that associated with the historical facial characteristics 430.

Block 914 generates data indicating the face represented in the first image is likely to be the same as a face represented in the second image. In some implementations, this data may be used to authenticate an identity of a user 116. For example, the user 116(1) which entered the entry area 124 may be associated with the identity data 428 corresponding to that user 116(1). In some implementations, the authentication of the user 116 may be based at least in part on the comparison between historical facial characteristics 430 and the entry facial characteristics 442.

Block 916 configures at least a portion of the materials handling facility 102 for the user 116. In one implementation, an identity may be determined which is associated with the identifier value. Parameters associated with the identity may then be retrieved. These parameters may specify user interface preferences, designate which areas of the facility 102 the user 116 has privileges to enter, indicate picking preferences, and so forth. For example, the configuration may include configuring user interfaces as presented to the user 116 within the facility 102 in accordance with the user interface preferences specified in the parameters. In another example, the user 116 may be allowed to enter portions of the facility 102 for which the parameters specify access is permitted, and disallowed entrance to other portions. In yet another example, based on the identity of the user 116, costs associated with the picking of items 104 may accrue to a financial account of the user 116.

Figure 10:
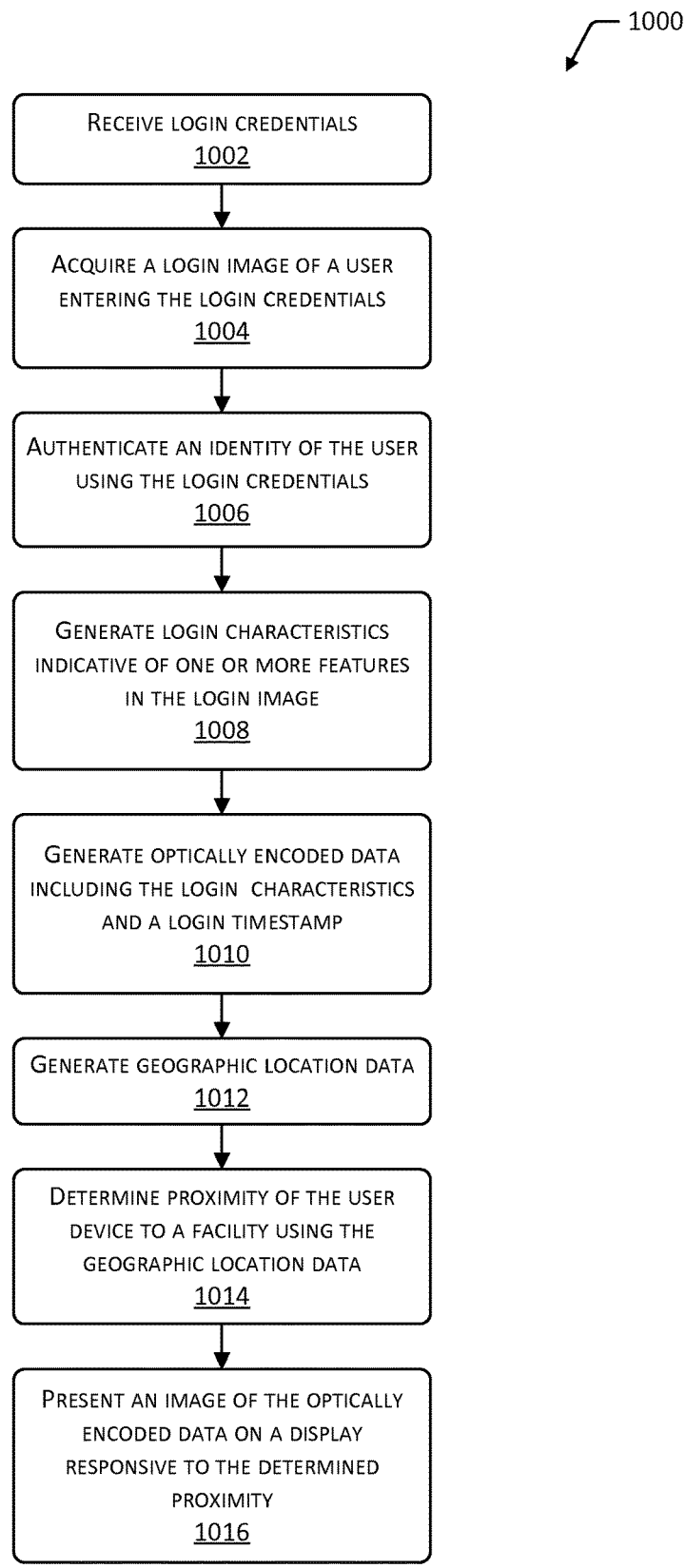
FIG. 10 depicts a flow diagram of generating and presenting optically encoded data for use in authenticating the user at a facility, according to some implementations.

FIG. 10 depicts a flow diagram 1000 of generating and presenting optically encoded data 128 for use in authenticating the user 116 at the facility 102, according to some implementations. The process 1000 may be performed at least in part by one or more of the client authentication module 316, the inventory management module 416, the authentication module 418, the arrival determination module 420, or another module. In one implementation, blocks 1002 through 1016 may be performed at least in part by the user device 126.

Block 1002 receives login credentials 328 by way of an input device. For example, the user 116 may enter text corresponding to a username and password using a touch sensor 120(5), buttons 120(6), and so forth. In another example, the user 116 may have their fingerprints scanned by a fingerprint sensor or other biometric sensors 120(8).

Block 1004 acquires a login image 324 of the user 116 with the imaging sensor 120(1). The acquisition of the login image 324 may be contemporaneous with input of at least a portion of the login credentials 328 to the input device, such as the touch sensor 120(5), buttons 120(6), fingerprint sensor, and so forth. For example, the login image 324 may be acquired by a front facing camera while the user 116 swipes a finger across the fingerprint sensor. As described above, in other implementations the login image 324 may be of another person authorized or permitted by the user 116, or of a non-facial object.

Block 1006 authenticates an identity of the user 116 using the login credentials 328. For example, the user device 126 may send the login credentials 328 to the authentication system 130 for authentication. Responsive to this, the user device 126 may receive the login response data 434. In another example, the user device 126 may authenticate the login credentials 328 locally on the user device 126.

Block 1008 generates login characteristics indicative of one or more features in the login image 324. In one implementation the login characteristics may comprise the login facial characteristics 334. In other implementations, other characteristics such as color, pattern, shape, and so forth of other portions of the user's 116 anatomy, clothing, ornamentation, and so forth may be assessed. For example, the anatomical characteristics may include a ratio of upper arm length to width of the user's 116 shoulders.

Block 1010 generates optically encoded data 128. As described above, the optically encoded data 128 may comprise one or more images which encode data. This data may include one or more of: a login timestamp 330 indicative of a time the login image 324 was acquired, the login characteristics such as the login facial characteristics 334, the identifier value 332, or other information.

Block 1012 generates geographic location data using the location sensor 120(3). For example, a GPS receiver of the user device 126 may provide data indicative of a latitude and longitude of the user device 126.

Block 1014 determines proximity of the user device 126 to the facility 102 using the geographic location data. In one implementation the determination may be made by the user device 126. For example, geographic location data for the facility 102 may be stored within the memory 310 of the user device 126. By using the geographic location data of the user device 126 and the geographic location data for the facility 102, a distance between the two points may be calculated. In another implementation the determination may be made by a resource external to the user device 126, such as the server(s) 204. For example, the user device 126 may send the geographic location data to a map server configured to return information indicative of the distance between the user device 126 and the facility 102.

In other implementations, instead of or in addition to the use of the location sensor 120(3), the RF data 326 may be used to determine proximity. For example, the user device 126 may obtain a list of SSIDs or other information associated with wireless activity at the facility 102. By analyzing RF data 326 acquired by the user device 126, proximity to an access point 210 of the facility 102 may be determined. Continuing the example, the entry area 124 may have an access point 210 broadcasting beacon frames having an SSID of "ENTRYAREA124". The client authentication module 316 may identify the SSID of "ENTRYAREA124" in the RF data 326 and determine the user device 126 is proximate to the entry area 124.

Block 1016 presents the image of the optically encoded data 128 on the display device 212(3). As described above, in some implementations the presentation may be responsive to a determination that the user device 126 is proximate to the facility 102, or a portion thereof, such as the entry area 124. Once presented, the authentication system 130 may proceed as described above to authenticate the user 116 based at least in part on the optically encoded data 128.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
a user device comprising:
  a first communication interface configured to communicatively couple to a network;
  a display configured to present images;
  an input device configured to accept user input;
  a first camera configured to acquire an image of a user;
  a first memory storing first computer-executable instructions; and
  a first hardware processor in communication with the first communication interface, the display, the input device, the first camera, and the first memory, wherein the first hardware processor is configured to execute the first computer-executable instructions to:
    receive login credentials by way of the input device at a first time;
    acquire a login image of the user with the first camera at a second time that is substantially the same as the first time;
    send an authentication request based at least in part on the login credentials to an authentication server;
    receive, from the authentication server, data indicating identity of the user is authenticated;
    generate an identifier value;
    send the identifier value to the authentication server, wherein the identifier value is associated with the identity of the user;
    generate login facial characteristics indicative of one or more facial features of the user in the login image;
    generate optically encoded data that encodes login information for the user, the optically encoded data represented by one or more barcodes that encode:
      a login timestamp indicative of a time the login image was acquired,
      the identifier value, and
      the login facial characteristics from the login image; and
    present the one or more barcodes on the display; and
a server comprising:
  a second communication interface configured to communicatively couple to the network;
  a second memory storing second computer-executable instructions; and
  a second hardware processor in communication with the second communication interface and the second memory, wherein the second hardware processor is configured to execute the second computer-executable instructions to:
    responsive to the user approaching an entry area of a facility:
      acquire an entry image of the user and the one or more barcodes as presented on the display;
      determine an entry timestamp indicative of a time the entry image was acquired;
      generate entry facial characteristics indicative of one or more facial features of the user in the entry image;
      determine the optically encoded data presented by the one or more barcodes;
      decode the optically encoded data represented by the one or more barcodes to extract the login facial characteristics of the user and the login timestamp;
      determine the login timestamp is within a predetermined period of time of the entry timestamp;
      compare the entry facial characteristics with the decoded login facial characteristics to determine the user depicted in the login image and the entry image is the same; and
      authorize entry of the user to the facility.

2. The system of claim 1, wherein the second hardware processor is further configured to execute the second computer-executable instructions to:
  send the identifier value to the user device;
  retrieve historical facial characteristics associated with the identifier value;
  compare the entry facial characteristics with the historical facial characteristics to determine the user depicted in the entry image is associated with the identifier value; and
  wherein the authorization for entry of the user to the facility is based at least in part on the identifier value.

3. The system of claim 1, wherein at least one of the one or more barcodes comprises a two-dimensional matrix code comprising two or more colors.

4. A method comprising:
at a first time:
  receiving login credentials; and
  acquiring a login image of a user; and
at a second time and responsive to the user approaching an entry of a materials handling facility:
  accessing a first image having a first timestamp;
  generating a first set of facial characteristics indicative of a first face represented in the first image;
  determining, in the first image, optically encoded data presented by a display device of a user device, wherein the optically encoded data comprises two or more machine readable graphics displayed by the display device of the user device;
  decoding the optically encoded data represented by the two or more machine readable graphics to produce encrypted data;
  decrypting the encrypted data to extract:
    a second timestamp,
    an identifier value, and
    a second set of facial characteristics that are indicative of a second face represented in a second image, the second set of facial characteristics derived from the login credentials and the login image generated for the user at the first time;

determining the second timestamp is within a time range of the first timestamp;

comparing the first set of facial characteristics with the second set of facial characteristics;

generating data indicating the first face represented in the first image corresponds to the second face represented in the second image within a threshold; and responsive to the data indicating that the first face represented in the first image corresponds to the second face represented in the second image within the threshold, allowing entry of the user into the materials handling facility.

5. The method of claim 4, further comprising:

determining an identity of the user associated with the first face represented in the first image by associating the identifier value with identity data indicative of the user; and wherein the identifier value is based at least in part on one or more of:
a media access control address of the user device,
an integrated circuit card identifier (ICCID) of the user device,
the login credentials entered into the user device, or
a hash of the identity.

6. The method of claim 4, wherein the time range is associated with the identifier value.

7. The method of claim 4, further comprising:

determining an estimated time of arrival of the user at the materials handling facility; and wherein the time range is inclusive of the estimated time of arrival.

8. The method of claim 4, further comprising:

retrieving a historical set of facial characteristics associated with the identifier value; and comparing the first set of facial characteristics with the historical set of facial characteristics.

9. The method of claim 4, further comprising:

determining the user is approaching the entry of the materials handling facility; and acquiring the first image.

10. The method of claim 4, wherein the first set of facial characteristics and the second set of facial characteristics include data indicative of a relative arrangement between a plurality of facial features, the plurality of facial features associated with one or more of:
one or both eyes,
mouth,
nose,
skin texture,
three-dimensional shape of a face, or
eyeglasses.

11. The method of claim 4, further comprising:

detecting, in the first image, that at least one of the two or more machine readable graphics comprises a two-dimensional matrix code comprising two or more colors.

12. The method of claim 4, wherein the two or more machine readable graphics are presented at different times by the display device of the user device.

13. The method of claim 4, further comprising:

determining an identity associated with the identifier value;

retrieving parameters associated with the identity; and configuring the materials handling facility using the parameters.

14. A user device comprising:
a communication interface configured to communicatively couple to a network;
a display device configured to present images;
an input device configured to accept input from a user, wherein the input device comprises at least one of a fingerprint sensor or a touch sensor;
an imaging sensor configured to acquire an image of the user during use;
a memory storing computer-executable instructions; and
a hardware processor in communication with the communication interface, the display device, the input device, the imaging sensor, and the memory, wherein the hardware processor is configured to execute the computer-executable instructions to:
receive login credentials by way of the input device at a first time;
acquire a login image of the user with the imaging sensor at a second time that is within a time range of the first time;
authenticate an identity of the user using the login credentials;
generate login characteristics indicative of one or more facial features of the user in the login image;
generate optically encoded data that encodes login information for the user, the optically encoded data represented by one or more machine readable images which encode at least:
a login timestamp indicative of a time the login image was acquired, and
the login characteristics; and
present the one or more machine readable images of the optically encoded data on the display device, responsive to the user approaching an entry area of a facility.

15. The user device of claim 14, further comprising:
a location sensor configured to generate geographic location data indicative of a physical position of the user device; and
the hardware processor is further configured to execute the computer-executable instructions to:
generate the geographic location data using the location sensor;
determine proximity of the user device to the facility using the geographic location data, the proximity of the user device to the facility indicative of the user approaching the entry area of the facility; and
wherein the presentation of the one or more machine readable images of the optically encoded data on the display device is responsive to the proximity of the user device to the facility.

16. The user device of claim 14, further comprising:
a location sensor configured to generate geographic location data indicative of a physical position of the user device; and
the hardware processor is further configured to execute the computer-executable instructions to:
generate the geographic location data using the location sensor; and
provide the geographic location data to a server.

17. The user device of claim 14, wherein the login credentials comprise a fingerprint of the user as acquired by the fingerprint sensor.

18. The user device of claim 14, the imaging sensor comprising one or more of:

a structured light emitter,
a pair of cameras configured to generate stereoscopic images,
a laser scanner,
an optical time-of-flight camera,
an optical interferometer, or
a coded aperture camera; and
wherein the login characteristics are indicative of three-dimensional features.

19. The user device of claim 14, wherein the optically encoded data further encodes one or more of:
an identifier value associated with the user;
a media access control address of the user device, or
an integrated circuit card identifier (ICCID) of the user device.

20. The user device of claim 14, wherein the one or more machine readable images are presented simultaneously on the display device.

21. A method comprising:
accessing one or more images of a user upon the user approaching a facility, wherein the one or more images of the user are associated with an entry timestamp;
detecting, in at least one of the one or more images of the user, optically encoded data presented by a display of a user device, wherein the optically encoded data comprises a machine-readable graphic displayed by the display of the user device;
generating a first set of facial characteristics indicative of a first face represented in the one or more images of the user;
decoding the optically encoded data represented by the machine-readable graphic to extract a second set of facial characteristics that are indicative of a second face represented in one or more login images of the user and a login timestamp;
comparing the entry timestamp and the login timestamp;
comparing the first set of facial characteristics with the second set of facial characteristics;
generating data indicating the first face represented in the one or more images of the user corresponds to the second face represented in the one or more login images of the user within a threshold; and
allowing entry of the user into the facility.

22. A method comprising:
accessing one or more images of a user taken upon entry to a facility, wherein the one or more images of the user are associated with an entry timestamp;
determining, in the one or more images of the user, optically encoded data presented by a display of a user device, wherein the optically encoded data comprises a machine-readable graphic displayed by the display of the user device;
decoding the optically encoded data represented by the machine-readable graphic to determine a first set of facial characteristics indicative of a first face represented in one or more login images of a user and a login timestamp, wherein the login timestamp is before the entry timestamp;
comparing the first set of facial characteristics with a second set of facial characteristics indicative of a second face represented in the one or more images of the user taken upon entry to the facility;
authenticating an identity of the user, based on a determination that the first face represented in the one or more login images of the user corresponds to the second face represented in the one or more images of the user within a threshold; and
configuring at least a portion of the facility for use by the user.

\* \* \* \* \*

UNITED STATES PATENT AND TRADEMARK OFFICE
CERTIFICATE OF CORRECTION

| | |
|---|---|
| PATENT NO. | : 11,615,663 B1 |
| APPLICATION NO. | : 14/306669 |
| DATED | : March 28, 2023 |
| INVENTOR(S) | : Ammar Chinoy et al. |

It is certified that error appears in the above-identified patent and that said Letters Patent is hereby corrected as shown below:

In the Claims

Column 33, Claim 1, Lines 43-44:
Currently read: "camera at a second time that is substantially the same as the first time"
Where they should read: -- camera at a second time that is within a time range of the first time --.

Column 33, Claim 1, Line 46:
Currently reads: "on the login credentials to an authentication"
Where it should read: -- on the login credentials, to an authentication --.

Column 34, Claim 1, Line 1:
Currently reads: "a second communication interface configured to.."
Where it should read: -- a second input device configured to accept second user input;
a second communication interface configured to.. --.

Column 34, Claim 1, Line 6:
Currently reads: "the second communication interface and the second"
Where it should read: -- the second input device, the second communication interface, and the second --.

Column 34, Claim 1, Line 27:
Currently reads: "decoded login facial characteristics to determine"
Where it should read: -- login facial characteristics to determine --.

Signed and Sealed this
Second Day of May, 2023

Katherine Kelly Vidal
*Director of the United States Patent and Trademark Office*